(12) United States Patent
Mikoshiba et al.

(10) Patent No.: US 12,196,284 B2
(45) Date of Patent: Jan. 14, 2025

(54) VIBRATION-DAMPING DEVICE

(71) Applicant: Prospira Corporation, Kawasaki (JP)

(72) Inventors: Rei Mikoshiba, Tokyo (JP); Yuki Satake, Tokyo (JP); Akira Ueki, Tokyo (JP)

(73) Assignee: Prospira Corporation, Kawasaki (JP)

( * ) Notice: Subject to any disclaimer, the term of this patent is extended or adjusted under 35 U.S.C. 154(b) by 293 days.

(21) Appl. No.: 17/772,360

(22) PCT Filed: Nov. 9, 2020

(86) PCT No.: PCT/JP2020/041719
§ 371 (c)(1),
(2) Date: Apr. 27, 2022

(87) PCT Pub. No.: WO2021/090949
PCT Pub. Date: May 14, 2021

(65) Prior Publication Data
US 2022/0403912 A1    Dec. 22, 2022

(30) Foreign Application Priority Data

Nov. 7, 2019 (JP) ................. 2019-202575
Nov. 7, 2019 (JP) ................. 2019-202578
Nov. 7, 2019 (JP) ................. 2019-202592

(51) Int. Cl.
*F16F 13/10*     (2006.01)
*B60K 5/12*      (2006.01)

(52) U.S. Cl.
CPC .......... *F16F 13/107* (2013.01); *B60K 5/1208* (2013.01); *B60K 5/1283* (2013.01);
(Continued)

(58) Field of Classification Search
CPC .. F16F 13/107; F16F 2228/06; F16F 2230/36; F16F 2230/186; B60K 5/1208; B60K 5/1283
(Continued)

(56) References Cited

U.S. PATENT DOCUMENTS

| 4,651,980 A | 3/1987 | Morita et al. |
| 4,679,776 A | 7/1987 | Remmel et al. |

(Continued)

FOREIGN PATENT DOCUMENTS

| CN | 101285513 A | 10/2008 |
| CN | 101883932 A | 11/2010 |

(Continued)

OTHER PUBLICATIONS

Apr. 25, 2023, Office Action issued by the United States Patent and Trademark Office in the U.S. Appl. No. 17/050,868.
(Continued)

*Primary Examiner* — Christopher P Schwartz
(74) *Attorney, Agent, or Firm* — KENJA IP LAW PC

(57) ABSTRACT

A vibration-damping device includes a partition member provided with an orifice passage that allows a main liquid chamber and an auxiliary liquid chamber to communicate with each other, a plurality of first communication holes that allows the main liquid chamber and an accommodation chamber to communicate with each other, and a second communication hole that allows the auxiliary liquid chamber and the accommodation chamber to communicate with each other. A tubular member that protrudes in an axial direction toward the elastic body is disposed on a first wall surface of the partition member to which the first communication holes are open and which constitutes a portion of an inner surface of the main liquid chamber. The plurality of first communication holes are open to both an inner portion located
(Continued)

inside the tubular member and an outer portion located outside the tubular member, on the first wall surface.

20 Claims, 8 Drawing Sheets

(52) U.S. Cl.
CPC ..... *F16F 2228/06* (2013.01); *F16F 2230/186* (2013.01); *F16F 2230/36* (2013.01)

(58) Field of Classification Search
USPC ..... 267/140.11–140.15, 140.2, 140.3, 140.4, 267/141.1–141.7
See application file for complete search history.

(56) References Cited

U.S. PATENT DOCUMENTS

| | | | |
|---|---|---|---|
| 4,708,329 A | 11/1987 | Tabata et al. | |
| 4,721,292 A | 1/1988 | Saito | |
| 4,773,634 A * | 9/1988 | Hamaekers | F16F 13/106 137/493 |
| 4,903,951 A | 2/1990 | Miyamoto et al. | |
| 4,925,162 A | 5/1990 | Kojima | |
| 4,997,168 A * | 3/1991 | Kato | F16F 13/10 267/140.13 |
| 5,102,105 A | 4/1992 | Hamaekers et al. | |
| 5,464,196 A * | 11/1995 | Dankowski | F16F 13/20 267/140.13 |
| 5,499,799 A | 3/1996 | Kojima | |
| 6,257,562 B1 * | 7/2001 | Takashima | F16F 13/105 267/141.1 |
| 6,390,459 B2 | 5/2002 | Saitoh | |
| 6,612,554 B1 | 9/2003 | Linn | |
| 6,637,734 B2 * | 10/2003 | Thomazeau | F16F 13/103 267/140.13 |
| 6,793,206 B2 * | 9/2004 | Reh | F16F 13/106 267/140.13 |
| 6,923,435 B2 | 8/2005 | Pizanti et al. | |
| 7,258,331 B2 | 8/2007 | Schneider | |
| 7,344,128 B2 | 3/2008 | Muramatsu et al. | |
| 7,802,777 B2 | 9/2010 | Katayama et al. | |
| 8,474,799 B2 | 7/2013 | Michiyama et al. | |
| 8,894,051 B2 | 11/2014 | Yamamoto et al. | |
| 9,046,147 B2 | 6/2015 | Tsutsumi | |
| 9,273,744 B2 * | 3/2016 | West | F16F 13/262 |
| 9,347,516 B2 | 5/2016 | Kadowaki | |
| 9,365,101 B2 | 6/2016 | Okumura | |
| 9,366,309 B2 | 6/2016 | Marienfeld et al. | |
| 9,488,246 B2 | 11/2016 | Satori et al. | |
| 9,719,575 B2 | 8/2017 | Kojima | |
| 9,726,251 B2 | 8/2017 | Nagasawa et al. | |
| 9,772,002 B2 | 9/2017 | Ueki et al. | |
| 9,878,604 B2 | 1/2018 | Furusawa et al. | |
| 10,030,738 B2 | 7/2018 | Ueki et al. | |
| 10,422,404 B2 | 9/2019 | Oniwa | |
| 10,436,281 B2 | 10/2019 | Kim | |
| 10,584,761 B2 | 3/2020 | Fourman | |
| 10,589,615 B2 | 3/2020 | Chern et al. | |
| 10,781,881 B2 | 9/2020 | Ishikawa | |
| 10,989,269 B2 | 4/2021 | Kojima | |
| 11,241,949 B2 | 2/2022 | Beckmann et al. | |
| 11,428,290 B2 | 8/2022 | Ueki et al. | |
| 11,441,634 B2 | 9/2022 | Nagashima et al. | |
| 11,959,527 B2 * | 4/2024 | Satake | F16F 13/105 |
| 12,110,937 B2 * | 10/2024 | Satake | F16F 13/105 |
| 12,129,904 B2 * | 10/2024 | Mikoshiba | B60K 5/1283 |
| 2002/0043748 A1 | 4/2002 | Meyer | |
| 2003/0030202 A1 | 2/2003 | Thomazeau et al. | |
| 2003/0038414 A1 | 2/2003 | Pizanti et al. | |
| 2003/0085498 A1 | 5/2003 | Reh et al. | |
| 2005/0206056 A1 | 9/2005 | Maeno et al. | |
| 2008/0290573 A1 | 11/2008 | Katayama et al. | |
| 2009/0140476 A1 | 6/2009 | Michiyama et al. | |
| 2009/0140477 A1 | 6/2009 | Michiyama | |
| 2009/0243171 A1 | 10/2009 | Nanno et al. | |
| 2009/0283945 A1 | 11/2009 | Kojima et al. | |
| 2010/0072683 A1 | 3/2010 | Saito et al. | |
| 2010/0102495 A1 | 4/2010 | Okumura et al. | |
| 2013/0069289 A1 | 3/2013 | Ishikawa et al. | |
| 2013/0154171 A1 | 6/2013 | Nishi et al. | |
| 2014/0327199 A1 | 11/2014 | Kanaya | |
| 2015/0028530 A1 | 1/2015 | Kanaya et al. | |
| 2015/0330476 A1 | 11/2015 | Satori et al. | |
| 2015/0337919 A1 | 11/2015 | Kojima | |
| 2016/0053844 A1 | 2/2016 | Nagasawa et al. | |
| 2016/0053845 A1 | 2/2016 | Ueki et al. | |
| 2016/0053846 A1 | 2/2016 | Nagasawa et al. | |
| 2016/0223048 A1 | 8/2016 | Kojima | |
| 2017/0023089 A1 | 1/2017 | Ueki | |
| 2017/0030428 A1 | 2/2017 | Ueki | |
| 2017/0089420 A1 | 3/2017 | Kadowaki et al. | |
| 2017/0335920 A1 | 11/2017 | Kanaya et al. | |
| 2018/0051769 A1 | 2/2018 | Kim | |
| 2018/0073591 A1 | 3/2018 | Nagasawa et al. | |
| 2019/0017567 A1 | 1/2019 | Kim | |
| 2019/0061509 A1 | 2/2019 | Kim | |
| 2019/0092155 A1 | 3/2019 | Inoue et al. | |
| 2019/0128364 A1 | 5/2019 | Kim | |
| 2020/0049224 A1 | 2/2020 | Ueki et al. | |
| 2020/0400210 A1 | 12/2020 | Ueki et al. | |
| 2021/0239180 A1 | 8/2021 | Satake et al. | |
| 2022/0373058 A1 * | 11/2022 | Mikoshiba | F16F 13/108 |
| 2022/0397177 A1 * | 12/2022 | Satake | F16F 13/105 |
| 2022/0403911 A1 | 12/2022 | Mikoshiba et al. | |

FOREIGN PATENT DOCUMENTS

| | | |
|---|---|---|
| CN | 102725558 A | 10/2012 |
| CN | 103363013 A | 10/2013 |
| CN | 106574682 A | 4/2017 |
| CN | 106641087 A | 5/2017 |
| CN | 106662195 A | 5/2017 |
| CN | 108980261 A | 12/2018 |
| CN | 109690127 A | 4/2019 |
| CN | 110192045 A | 8/2019 |
| CN | 112074672 A | 12/2020 |
| DE | 102016101203 A1 | 7/2017 |
| EP | 1028268 A2 | 8/2000 |
| EP | 1283377 A1 | 2/2003 |
| FR | 2604231 A1 | 3/1988 |
| GB | 2282430 A | 4/1995 |
| JP | H01193426 A | 8/1989 |
| JP | H01224544 A | 9/1989 |
| JP | H0522890 U | 3/1993 |
| JP | H084823 A | 1/1996 |
| JP | 2553356 Y2 | 11/1997 |
| JP | 2002155984 A | 5/2002 |
| JP | 2002295571 A | 10/2002 |
| JP | 2002-327789 A | 11/2002 |
| JP | 2003130125 A | 5/2003 |
| JP | 2006200590 A | 8/2006 |
| JP | 2007182930 A | 7/2007 |
| JP | 2007-218420 A | 8/2007 |
| JP | 2009243543 A | 10/2009 |
| JP | 2010-031989 A | 2/2010 |
| JP | 2012172736 A | 9/2012 |
| JP | 2013032828 A | 2/2013 |
| JP | 2013228003 A | 11/2013 |
| JP | 2013228004 A | 11/2013 |
| JP | 2013231454 A | 11/2013 |
| JP | 5642241 B1 | 12/2014 |
| JP | 2015-059655 A | 3/2015 |
| JP | 2021076163 A | 5/2021 |
| JP | 2021076166 A | 5/2021 |
| JP | 2021076168 A | 5/2021 |
| JP | 2021076169 A | 5/2021 |
| JP | 2021076170 A | 5/2021 |
| JP | 2021076171 A | 5/2021 |
| JP | 2021076173 A | 5/2021 |
| WO | 2018198444 A1 | 11/2018 |
| WO | 2019/216403 A1 | 11/2019 |

(56) References Cited

FOREIGN PATENT DOCUMENTS

OTHER PUBLICATIONS

Aug. 27, 2021, search result of Office Action issued by the China National Intellectual Property Administration in the Chinese Patent Application No. 201980030454.4.
Dec. 1, 2021, search result of the Extended European Search Report issued by the European Patent Office in the European Patent Application No. 19799394.2.
Dec. 8, 2020, International Search Report issued in the International Patent Application No. PCT/JP2020/041370.
Dec. 8, 2020, International Search Report issued in the International Patent Application No. PCT/JP2020/041609.
Dec. 8, 2020, International Search Report issued in the International Patent Application No. PCT/JP2020/041665.
Jul. 23, 2019, International Search Report issued in the International Patent Application No. PCT/JP2019/018695.
May 10, 2022, International Preliminary Report on Patentability issued in the International Patent Application No. PCT/JP2020/038572.
May 10, 2022, International Preliminary Report on Patentability issued in the International Patent Application No. PCT/JP2020/041370.
May 10, 2022, International Preliminary Report on Patentability issued in the International Patent Application No. PCT/JP2020/041609.
May 10, 2022, International Preliminary Report on Patentability issued in the International Patent Application No. PCT/JP2020/041665.
May 10, 2022, International Preliminary Report on Patentability issued in the International Patent Application No. PCT/JP2020/041719.
Nov. 10, 2020, International Preliminary Report on Patentability issued in the International Patent Application No. PCT/JP2019/018695.
Nov. 10, 2020, International Search Report issued in the International Patent Application No. PCT/JP2020/038572.
International Search Report of PCT/JP2020/041719 dated Dec. 28, 2020 [PCT/ISA/210].
Jul. 12, 2024, search result of Office Action issued by the China National Intellectual Property Administration in the related Chinese Patent Application No. 202080076453.6.
Sep. 10, 2024, search result of Office Action issued by the China National Intellectual Property Administration in the corresponding Chinese Patent Application No. 202080075597.X.
May 25, 2024, search result of Office Action issued by the China National Intellectual Property Administration in the related Chinese Patent Application No. 202080076453.6.
May 30, 2024, search result of Office Action issued by the China National Intellectual Property Administration in the corresponding Chinese Patent Application No. 202080075597.X.
May 30, 2024, search result of Office Action issued by the China National Intellectual Property Administration in the related Chinese Patent Application No. 202080075442.6.

\* cited by examiner

VIBRATION-DAMPING DEVICE

CROSS REFERENCE TO RELATED APPLICATIONS

This application is a National Stage of International Application No. PCT/JP2020/041719 filed on Nov. 9, 2020, claiming priority based on Japanese Patent Application No. 2019-202575 filed on Nov. 7, 2019, Japanese Patent Application No. 2019-202578 filed on Nov. 7, 2019, and Japanese Patent Application No. 2019-202592 filed on Nov. 7, 2019.

TECHNICAL FIELD

The present invention relates to a vibration-damping device that is applied to, for example, automobiles, industrial machines, or the like, and absorbs and damps vibrations of vibration generating parts, such as engines.

BACKGROUND ART

As this type of vibration-damping device, in the related art, a configuration has been known that includes a tubular first attachment member that is coupled to any one of a vibration generating part and a vibration receiving part, and a second attachment member that is coupled to the other thereof, an elastic body that elastically couples both the attachment members to each other, a partition member that partitions a liquid chamber in the first attachment member in which a liquid is enclosed into a main liquid chamber having the elastic body as a portion of a partition wall and an auxiliary liquid chamber, and a movable member that is deformably or displaceably accommodated in an accommodation chamber provided in the partition member. The partition member is provided with an orifice passage that allows the main liquid chamber and the auxiliary liquid chamber to communicate with each other, a plurality of first communication holes that allow the main liquid chamber and the accommodation chamber to communicate with each other, and a second communication hole that allows the auxiliary liquid chamber and the accommodation chamber to communicate with each other. In this vibration-damping device, when a relatively high frequency idle vibration of low frequency vibration having a frequency of less than 200 Hz is input in an axial direction, the idle vibration is damped and absorbed by causing the liquid in the liquid chamber to flow through the first communication holes and the second communication hole while deforming and displacing the movable member in the accommodation chamber. Additionally, when shake vibration having a relatively low frequency is input in the axial direction, the shake vibration is dampened and absorbed by causing the liquid in the liquid chamber to flow through the orifice passage.

CITATION LIST

Patent Document

Patent Document 1
  Japanese Unexamined Patent Application, First Publication No. 2002-327789

SUMMARY OF INVENTION

Technical Problem

However, the related-art vibration-damping device cannot damp and absorb medium frequency vibration having a frequency of 200 Hz to 1000 Hz.

The present invention has been made in view of the above circumstances, and an object of the present invention is to provide a vibration-damping device capable of damping and absorbing medium frequency vibration.

Solution to Problem

A first aspect of a vibration-damping device according to the present invention includes a tubular first attachment member that is coupled to any one of a vibration generating part and a vibration receiving part, and a second attachment member that is coupled to the other thereof; an elastic body that elastically couples the first attachment member and the second attachment member to each other; a partition member that partitions a liquid chamber in the first attachment member in which a liquid is enclosed into a main liquid chamber having the elastic body as a portion of a partition wall and an auxiliary liquid chamber in an axial direction along a central axis of the first attachment member; and a movable member that is deformably or displaceably accommodated in an accommodation chamber provided in the partition member. The partition member is provided with an orifice passage that allows the main liquid chamber and the auxiliary liquid chamber to communicate with each other, a plurality of first communication holes that allow the main liquid chamber and the accommodation chamber to communicate with each other, and a second communication hole that allows the auxiliary liquid chamber and the accommodation chamber to communicate with each other. A tubular member that protrudes in the axial direction toward the elastic body is disposed on a first wall surface of the partition member to which the first communication hole is open and which constitutes a portion of an inner surface of the main liquid chamber. The plurality of first communication holes are open to both an inner portion located inside the tubular member and an outer portion located outside the tubular member, on the first wall surface. The partition member or the movable member includes a flow state adjustment portion that adjusts the flow of the fluid between an outer peripheral surface of the tubular member and an inner peripheral surface of the main liquid chamber.

Advantageous Effects of Invention

According to the present invention, the medium frequency vibration can be damped and absorbed.

DESCRIPTION OF EMBODIMENTS

Hereinafter, a first embodiment of a vibration-damping device according to the present invention will be described with reference to FIGS. 1 and 2.

Figure 1:
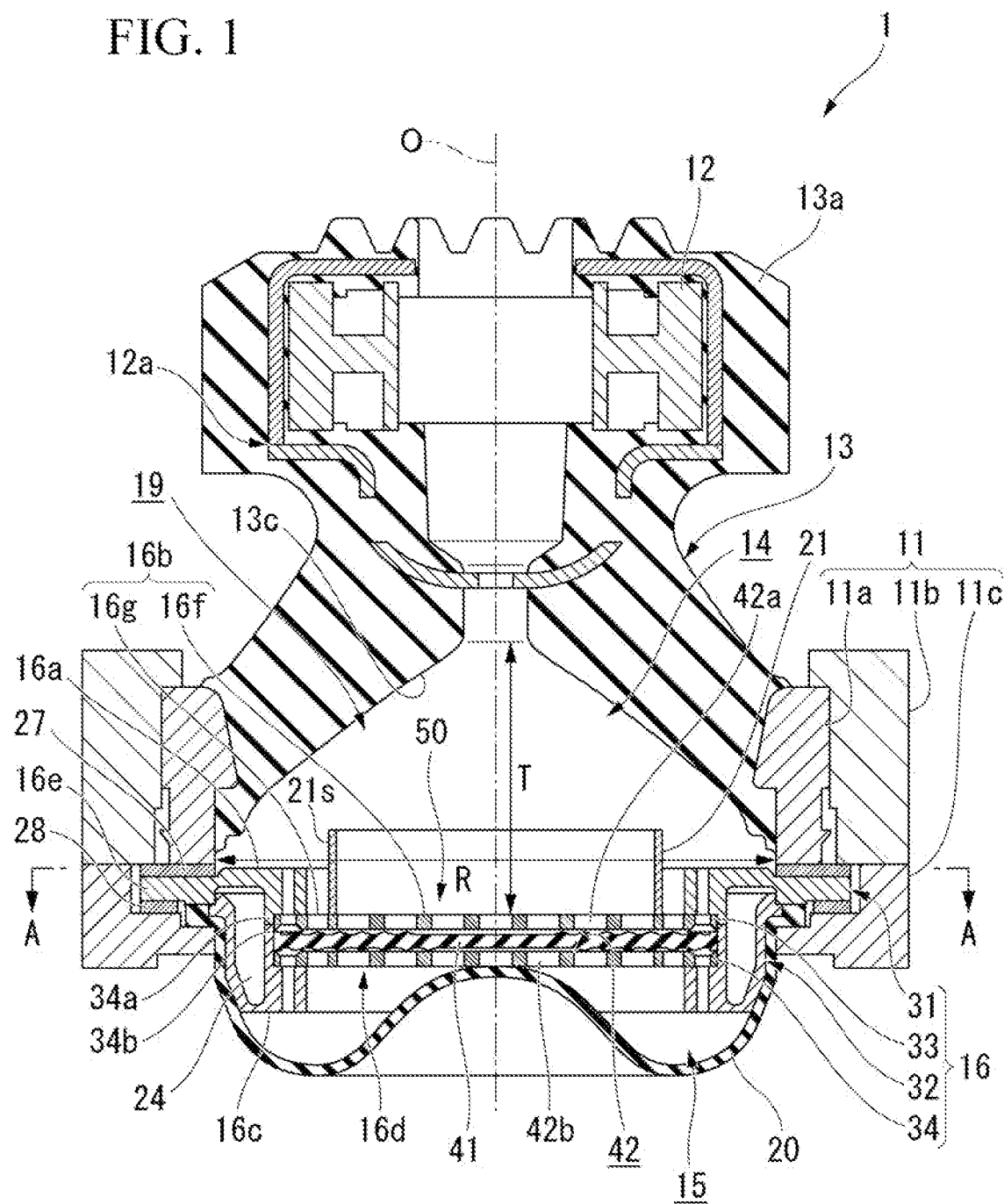
FIG. 1 is a longitudinal sectional view of a vibration-damping device according to a first embodiment of the present invention.

As illustrated in FIG. 1, the vibration-damping device 1 is a liquid-enclosed type vibration-damping device including a tubular first attachment member 11 that is coupled to any one of a vibration generating part and a vibration receiving part, a second attachment member 12 that is coupled to the other of the vibration generating part and the vibration receiving part, an elastic body 13 that elastically couples the first attachment member 11 and the second attachment member 12 to each other, a partition member 16 that partitions a liquid chamber 19 within the first attachment member 11 in which a liquid is enclosed into a main liquid chamber 14 having an elastic body 13 as a portion of a partition wall and an auxiliary liquid chamber 15, and a movable member 41 that is deformably or displaceably accommodated in an accommodation chamber 42 provided in the partition member 16.

Hereinafter, a direction along a central axis O of the first attachment member 11 is referred to as an axial direction. Additionally, the second attachment member 12 side in the axial direction is referred to as an upper side, and the partition member 16 side is referred to as a lower side. Additionally, in a plan view of the vibration-damping device 1 viewed from the axial direction, a direction intersecting the central axis O is referred to as a radial direction, and a direction around the central axis O is referred to as a circumferential direction. In addition, the first attachment member 11, the second attachment member 12, and the elastic body 13 each have a circular shape or an annular shape in a plan view and are disposed coaxially with the central axis O.

In a case where the vibration-damping device 1 is mounted on, for example, an automobile, the second attachment member 12 is coupled to an engine or the like serving as the vibration generating part, and the first attachment member 11 is coupled to a vehicle body serving as the vibration receiving part. Accordingly, the transmission of vibration of the engine or the like to the vehicle body is suppressed. In addition, the first attachment member 11 may be coupled to the vibration generating part, and the second attachment member 12 may be coupled to the vibration receiving part.

The first attachment member 11 includes an inner tubular portion 11*a*, an outer tubular portion 11*b*, and a lower support portion 11*c*. The inner tubular portion 11*a* is fitted into the outer tubular portion 11*b*. The lower support portion 11*c* is formed in an annular shape. A lower end opening edge of the outer tubular portion 11*b* is placed on an upper surface of an outer peripheral portion of the lower support portion 11*c*. The first attachment member 11 is formed in a cylindrical shape as a whole. The first attachment member 11 is coupled to the vehicle body or the like serving as the vibration receiving part via a bracket that is not shown.

The second attachment member 12 is located radially inside and above the first attachment member 11. The outer diameter of the second attachment member 12 is smaller than the inner diameter of the first attachment member 11. The second attachment member 12 is coupled to an engine or the like serving as the vibration generating part via an attachment metal fitting by fitting the attachment metal fitting (not shown) inside. In addition, the relative positions of the first attachment member 11 and the second attachment member 12 are not limited to the shown example and may be appropriately changed. Additionally, the outer diameter of the second attachment member 12 may be equal to or larger than the inner diameter of the first attachment member 11.

The elastic body 13 is formed in a tubular shape that extends in the axial direction. The diameter of the elastic body 13 increases downward from above. The first attachment member 11 and the second attachment member 12 are separately coupled to both end portions of the elastic body 13 in the axial direction. The second attachment member 12 is coupled to an upper end portion of the elastic body 13, and the first attachment member 11 is coupled to a lower end portion of the elastic body 13. The elastic body 13 blocks an upper end opening portion of the first attachment member 11. The lower end portion of the elastic body 13 is coupled to an inner peripheral surface of the inner tubular portion 11*a* of the first attachment member 11. An upper end portion of the elastic body 13 is coupled to a lower surface of the second attachment member 12. The elastic body 13 is formed of a rubber material or the like and is vulcanized and bonded to the first attachment member 11 and the second attachment member 12. The thickness of the elastic body 13 becomes smaller downward from above. In addition, the elastic body 13 may be formed of, for example, a synthetic resin material or the like. A stopper rubber 13*a* that covers an outer peripheral surface and an upper surface of the second attachment member 12 is integrally formed at the upper end portion of the elastic body 13. An outer shell body 12*a* surrounding the second attachment member 12 is buried in the elastic body 13 and the stopper rubber 13*a*.

The diaphragm 20 is made of elastic materials, such as rubber or soft resin and is formed in a bottomed cylindrical shape. As an upper end portion of the diaphragm 20 is sandwiched between an inner peripheral portion of the lower support portion 11*c* of the first attachment member 11 and an outer peripheral portion of the partition member 16, the liquid-tightness inside the diaphragm 20 is ensured, and a lower end opening portion of the first attachment member 11 is blocked.

In addition, in the shown example, a bottom portion of the diaphragm 20 has a shape that is deep on an outer peripheral side thereof and shallow at a central portion thereof. However, as the shape of the diaphragm 20, various shapes known in the related art can be adopted in addition to such a shape.

As the diaphragm 20 blocks the lower end opening portion of the first attachment member 11, and as described above, the elastic body 13 blocks the upper end opening portion of the first attachment member 11, the inside of the first attachment member 11 is the liquid chamber 19 that is liquid-tightly sealed. A liquid is enclosed (filled) in the liquid chamber 19. Examples of the liquid include ethylene glycol, water, silicone oil, and the like.

The liquid chamber 19 is partitioned into a main liquid chamber 14 and an auxiliary liquid chamber 15 in the axial direction by the partition member 16. The main liquid chamber 14 has an inner peripheral surface 13*c* of the elastic body 13 as a portion of a wall surface thereof, and is a space that is surrounded by the elastic body 13 and the partition member 16, and varies in internal volume depending on the deformation of the elastic body 13. The auxiliary liquid chamber 15 is a space that is surrounded by the diaphragm 20 and the partition member 16 and varies in internal volume depending on the deformation of the diaphragm 20. The vibration-damping device 1 having such a configuration is a compression-type device that is attached and used such that the main liquid chamber 14 is located on an upper side in the vertical direction and the auxiliary liquid chamber 15 is located on a lower side in the vertical direction.

The partition member 16 is provided with a plurality of first communication holes 42a that allow the main liquid chamber 14 and the accommodation chamber 42 to communicate with each other, and a second communication hole 42b that allows the auxiliary liquid chamber 15 and the accommodation chamber 42 to communicate with each other. A plurality of the second communication holes 42b are provided in the partition member 16, and the numbers of the first communication holes 42a and the second communication holes 42b are the same as each other. Each first communication hole 42a and each second communication hole 42b face each other in the axial direction. The inner diameters (flow passage cross-sectional areas) of the first communication hole 42a and the second communication hole 42b facing each other in the axial direction are the same as each other. The flow passage lengths of the first communication hole 42a and the second communication hole 42b facing each other in the axial direction are the same as each other. In addition, one second communication hole 42b may be formed in the partition member 16.

Here, in the partition member 16, an upper wall surface constituting a portion of an inner surface of the main liquid chamber 14 and a lower wall surface constituting a portion of an inner surface of the auxiliary liquid chamber 15 each have a circular shape coaxially disposed with the central axis O when viewed from the axial direction. The diameters of the upper wall surface and the lower wall surface of the partition member 16 are equal to each other. The upper wall surface of the partition member 16 faces the inner peripheral surface 13c of the elastic body 13 in the axial direction, and the lower wall surface of the partition member 16 faces an inner surface of the diaphragm 20 in the axial direction.

In the shown example, a recessed portion is provided over the entire region excluding an outer peripheral edge portion 16a on the upper wall surface of the partition member 16. The plurality of first communication holes 42a are open over the entire region of a bottom surface (hereinafter referred to as a first wall surface) 16b of the recessed portion. A recessed portion is provided over the entire region excluding an outer peripheral edge portion 16c on the lower wall surface of the partition member 16. The plurality of second communication holes 42b are open over the entire region of a bottom surface (hereinafter referred to as a second wall surface) 16d of the recessed portion. The recessed portion on each of the upper wall surface and the lower wall surface has a circular shape disposed coaxially with the central axis O when viewed from the axial direction, and sizes such as the inner diameter and the depth of each recessed portion are the same as each other.

The accommodation chamber 42 is provided in a portion of the partition member 16 located between the first wall surface 16b and the second wall surface 16d in the axial direction. The accommodation chamber 42 has a circular shape disposed coaxially with the central axis O when viewed from the axial direction. The diameter of the accommodation chamber 42 is larger than the diameters of the first wall surface 16b and the second wall surface 16d. The movable member 41 is formed in a plate shape in which the front and back surfaces face in the axial direction. The movable member 41 has a circular shape disposed coaxially with the central axis O when viewed from the axial direction. The movable member 41 is formed of an elastic material such as rubber or a soft resin.

The partition member 16 is provided with an orifice passage 24 that allows the main liquid chamber 14 and the auxiliary liquid chamber 15 to communicate with each other. The orifice passage 24 is provided in a portion of the partition member 16 located between the outer peripheral edge portion 16a of the upper wall surface and the outer peripheral edge portion 16c of the lower wall surface in the axial direction. An upper end of the orifice passage 24 is located above the first wall surface 16b, and a lower end of the orifice passage 24 is located below the second wall surface 16d. The flow passage cross-sectional shape of the orifice passage 24 is an oblong shape long in the axial direction. The resonance frequency of the orifice passage 24 is lower than the resonance frequencies of the first communication hole 42a and the second communication hole 42b.

Figure 2:
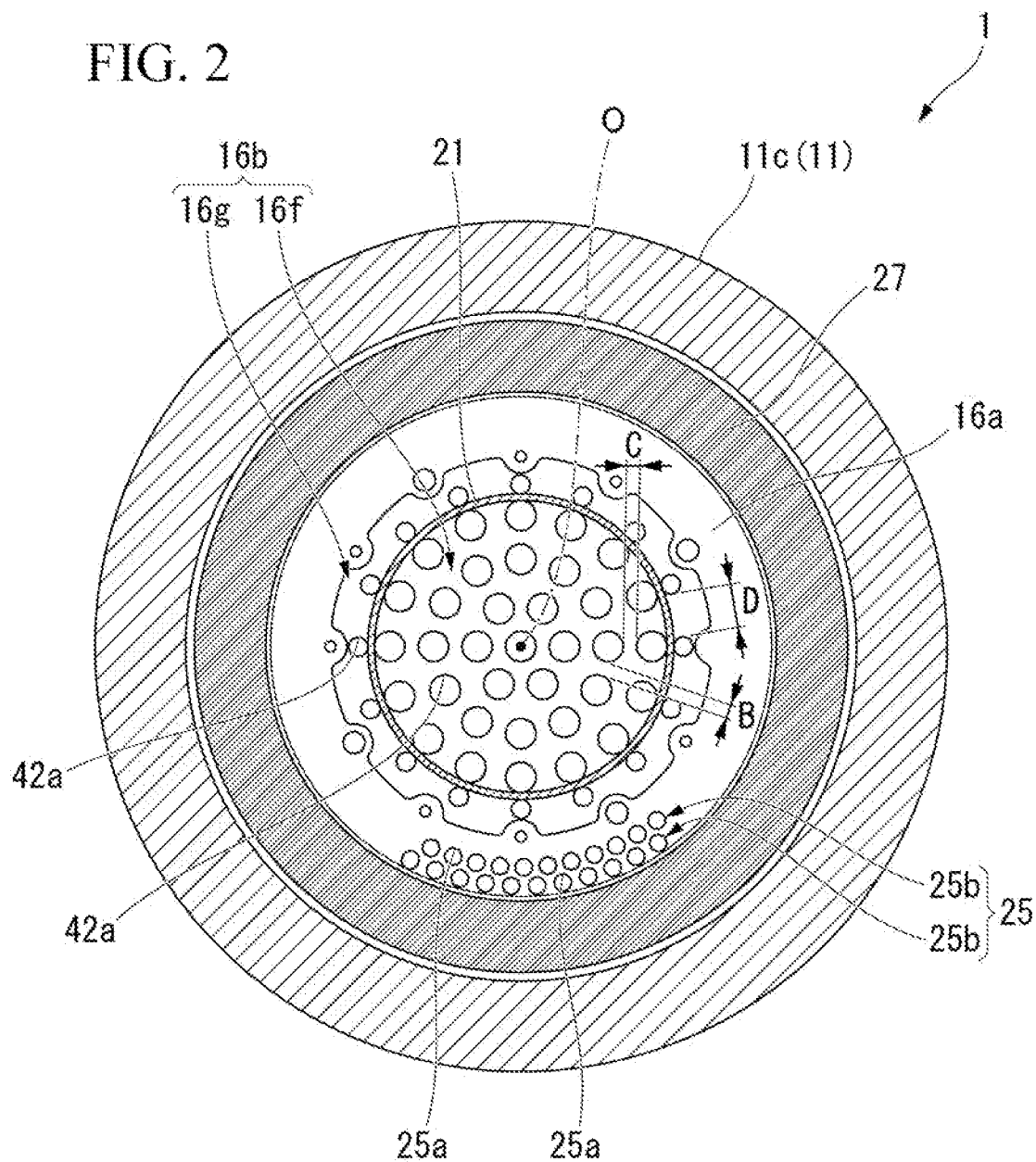
FIG. 2 is a cross-sectional view, taken along arrow line A-A, of a vibration-damping device shown in FIG. 1.

As shown in FIG. 2, an opening portion 25 on the main liquid chamber 14 side of the orifice passage 24 is provided on the outer peripheral edge portion 16a of the upper wall surface of the partition member 16. The opening portion 25 is configured such that a plurality of hole rows 25b in which a plurality of through-holes 25a are disposed at intervals in the circumferential direction are disposed at different positions in the radial direction and the circumferential direction. The inner diameter of the through-hole 25a is smaller than the inner diameter of the first communication hole 42a. Two hole rows 25b are disposed on the outer peripheral edge portion 16a of the upper wall surface of the partition member 16. The deviation amount of each hole row 25b in the circumferential direction and the deviation amount of each hole row 25b in the radial direction are each equal to the inner diameter of the through-hole 25a.

An opening portion on the auxiliary liquid chamber 15 side of the orifice passage 24 is provided on the outer peripheral edge portion 16c of the lower wall surface of the partition member 16 and is one opening having an opening area larger than the opening area of the opening portion 25 on the main liquid chamber 14 side, that is, the total sum of the opening areas of the plurality of through-holes 25a. The opening portion 25 on the main liquid chamber 14 side and the opening portion on the auxiliary liquid chamber 15 side in the orifice passage 24 are located radially outside the first communication hole 42a and the second communication hole 42b.

A flange portion 16e is provided at an upper end portion of the partition member 16 so as to protrude radially outward and continuously extend over the entire circumference. An upper surface of the flange portion 16e abuts against the lower end opening edges of the inner tubular portion 11a and the outer tubular portion 11b of the first attachment member 11 via an annular upper sealing material 27. A lower surface of the flange portion 16e abuts against an upper surface of the inner peripheral portion of the lower support portion 11c of the first attachment member 11 via an upper end opening edge of the diaphragm 20 and an annular lower sealing material 28 that surrounds the upper end opening edge of the diaphragm 20 from the outer side in the radial direction.

The partition member 16 includes an upper tubular body 31 and a lower tubular body 32 disposed so as to butt against each other in the axial direction and includes an upper wall 33 that blocks a lower end opening portion of the upper tubular body 31 and a lower wall 34 that blocks an upper end opening portion of the lower tubular body 32. In addition, the partition member 16 may be integrally formed.

The upper end opening edge of the upper tubular body 31 is the outer peripheral edge portion 16a of the aforementioned upper wall surface of the partition member 16. A flange portion 16e is provided at an upper end portion of the upper tubular body 31. A peripheral groove that is recessed upward and is open radially outward is provided at a portion of a lower end opening edge of the upper tubular body 31, which is located radially outside an inner peripheral portion of the lower end opening edge. The upper wall 33 is fixed to the inner peripheral portion of the lower end opening edge of the upper tubular body 31. The upper wall 33 is provided with the first communication hole 42a.

A peripheral groove that is recessed downward is provided at a radially intermediate portion of the upper end opening edge of the lower tubular body 32, which faces the peripheral groove of the upper tubular body 31 in the axial direction. The orifice passage 24 is defined by this peripheral groove and the peripheral groove of the upper tubular body 31. An outer peripheral edge portion of the upper end opening edge of the lower tubular body 32, which is located radially outside the peripheral groove, abuts against the lower surface of the flange portion 16e of the upper tubular body 31. The lower tubular body 32 is fitted into the upper end portion of the diaphragm 20, and the upper end portion of the diaphragm 20 is fitted into the lower support portion 11c of the first attachment member 11. Accordingly, the upper end portion of the diaphragm 20 is sandwiched between an outer peripheral surface of the lower tubular body 32 and an inner peripheral surface of the lower support portion 11c in the radial direction. The lower wall 34 is fixed to the inner peripheral portion of the upper end opening edge of the lower tubular body 32. The lower wall 34 is provided with the second communication hole 42b.

At least one of the inner peripheral portion at the lower end opening edge of the upper tubular body 31 and the inner peripheral portion of the upper end opening edge of the lower tubular body 32 is provided with butting protrusions 34a and 34b that protrude toward and abut against toward the other. In the shown example, the butting protrusions 34a and 34b are provided on both the inner peripheral portion of the lower end opening edge of the upper tubular body 31 and the inner peripheral portion of the upper end opening edge of the lower tubular body 32. The butting protrusions 34a and 34b are formed in an annular shape disposed coaxially with the central axis O, and the upper wall 33 and the lower wall 34 are disposed radially inside the butting protrusions 34a and 34b with a gap in the axial direction from each other. The accommodation chamber 42 is defined by a lower surface of the upper wall 33, an upper surface of the lower wall 34, and inner peripheral surfaces of the butting protrusions 34a and 34b.

Also, in the present embodiment, a tubular member 21 that protrudes in the axial direction toward the elastic body 13 is disposed on the first wall surface 16b of the partition member 16 to which the first communication hole 42a is open and which constitutes a portion of the inner surface of the main liquid chamber 14.

The tubular member 21 is formed in a cylindrical shape and is disposed coaxially with the central axis O. The tubular member 21 extends straight in the axial direction. The axial length of the tubular member 21 is equal to or larger than 20% of the axial maximum height T of the main liquid chamber 14. In the shown example, the axial maximum height T of the main liquid chamber 14 is an axial distance between an upper end portion of the inner peripheral surface 13c of the elastic body 13, which extends radially inward from the bottom to the top, and the first wall surface 16b. The axial length of the tubular member 21 is set such that the upper end portion of the tubular member 21 does not abut against the inner peripheral surface 13c of the elastic body 13 when an axial static load is applied to the vibration-damping device 1 and when axial vibration is input. In addition, as mentioned above, the inner peripheral surface 13c of the elastic body 13 is a portion that extends radially inward from the bottom to the top, and the upper end portion of the inner peripheral surface 13c of the elastic body 13 is an opening peripheral edge portion of a recessed portion of an inner surface of the elastic body 13 in a case where an upper end portion of the inner surface of the elastic body 13 that defines the main liquid chamber 14 is provided with the recessed portion that is recessed upward, as shown in the shown example.

An upper portion of the tubular member 21 protrudes upward from an upper end opening portion of the recessed portion provided on the upper wall surface of the partition member 16. An outer peripheral surface of the upper portion of the tubular member 21 faces a lower end portion of the inner peripheral surface of the inner tubular portion 11a of the first attachment member 11 and a lower end portion of the inner peripheral surface 13c of the elastic body 13 in the radial direction. The protruding length of the upper portion of the tubular member 21 from the upper end opening portion of the recessed portion is shorter than the depth of the recessed portion. Additionally, the protruding length is shorter than an axial distance between the portion of the inner peripheral surface 13c of the elastic body 13 where an upper end opening edge of the tubular member 21 faces in the axial direction and the upper end opening edge of the tubular member 21. The upper end opening edge of the tubular member 21 faces in the axial direction a portion deviating downward from a central portion in a direction in which the inner peripheral surface 13c extends, in a vertical cross-sectional view in the axial direction, on the inner peripheral surface 13c of the elastic body 13 extending radially inward from the bottom to the top.

The radius of an inner peripheral surface of the tubular member 21 is larger than the radial distance between the outer peripheral surface of the tubular member 21 and the inner peripheral surface of the recessed portion provided on the upper wall surface of the partition member 16. The inner diameter of the tubular member 21 is equal to or larger than half of a maximum inner diameter R of the main liquid chamber 14. In the shown example, the maximum inner diameter R of the main liquid chamber 14 is the inner diameter of a lower end portion of the inner tubular portion 11a of the first attachment member 11. In the first wall surface 16b, the plane area of a portion 16f (hereinafter referred to as an inner portion) located inside the tubular member 21 is larger than the plane area of a portion 16g (hereinafter referred to as an outer portion) located outside the tubular member 21.

The plurality of first communication holes 42a are open to both the inner portion 16f and the outer portion 16g of the first wall surface 16b. All of the plurality of first communication holes 42a face an upper surface of the movable member 41. The tubular member 21 is coupled to a portion of the first wall surface 16b located between adjacent first communication holes 42a and is disposed so as not to overlap the first communication hole 42a. The tubular member 21 is disposed such that the inner peripheral surface and the outer peripheral surface thereof are in contact with the first communication hole 42a when viewed from the axial direction.

Here, the partition member 16 includes a flow state adjustment portion 50. The flow state adjustment portion 50 adjusts the flow of a fluid between an outer peripheral surface 21s of the tubular member 21 and the inner peripheral surface 13c of the main liquid chamber 14. Here, the inner peripheral surface 13c of the main liquid chamber 14 is also the inner peripheral surface 13c of the elastic body 13. In addition, the flow state adjustment portion 50 includes the partition member 16 including the plurality of first communication holes 42a. The flow state adjustment portion 50 may have a plurality of different forms to be described below. In addition, although the partition member 16 is expressed to include the flow state adjustment portion 50, the partition member 16 may be expressed to constitute the flow state adjustment portion 50.

In the partition member 16 including the flow state adjustment portion 50, the number of the first communication holes 42a that are open to the outer portion 16g and the number of the first communication holes 42a that open to the inner portion 16f are different from each other. In the partition member 16 including the flow state adjustment portion 50 of the shown example, the number of the first communication holes 42a that are open to the outer portion 16g is smaller than the number of the first communication holes 42a that are open to the inner portion 16f. In the partition member 16 including the flow state adjustment portion 50, the proportion of the opening area of the first communication holes 42a to the plane area of the outer portion 16g and the proportion of the opening area of the first communication holes 42a to the plane area of the inner portion 16f are different from each other. In the partition member 16 including the flow state adjustment portion 50 of the shown example, the proportion of the opening area of the first communication holes 42a to the plane area of the outer portion 16g is smaller than the proportion of the opening area of the first communication holes 42a to the plane area of the inner portion 16f. In the partition member 16 including the flow state adjustment portion 50, the total sum of the opening areas of the first communication holes 42a that are open to the inner portion 16f is larger than the total sum of the opening areas of the first communication holes 42a that are open to the outer portion 16g.

The plurality of first communication holes 42a that are open to the outer portion 16g are disposed at equal intervals D in the circumferential direction over the entire length of the outer portion 16g in the circumferential direction. The plurality of first communication holes 42a that are open to the inner portion 16f are disposed at equal intervals over the entire region of the inner portion 16f. In the inner portion 16f, the plurality of first communication holes 42a are disposed at equal intervals B in the circumferential direction, and the row of the first communication holes 42a arranged in the circumferential direction in this way are disposed concentrically around the central axis O at equal intervals C in the radial direction.

In the inner portion 16f of the partition member 16 including the flow state adjustment portion 50, distances B and C between the first communication holes 42a adjacent to each other are smaller than the inner diameter of the first communication holes 42a. In the outer portion 16g of the partition member 16 including the flow state adjustment portion 50, a distance D between the first communication holes 42a adjacent to each other is larger than the inner diameter of the first communication holes 42a. The distances B and C between the first communication holes 42a adjacent to each other in the inner portion 16f of the partition member 16 including the flow state adjustment portion 50 and the distance D between the first communication holes 42a adjacent to each other in the outer portion 16g are different from each other. The distances B and C between the first communication holes 42a adjacent to each other in the inner portion 16f in the partition member 16 including the flow state adjustment portion 50 of the shown example are smaller than the distance D between the first communication holes 42a adjacent to each other in the outer portion 16g. The circumferential distance B and the radial distance C between the first communication holes 42a adjacent to each other in the inner portion 16f of the partition member 16 including the flow state adjustment portion 50 are smaller than the circumferential distance D between the first communication holes 42a adjacent to each other in the outer portion 16g. In the inner portion 16f of the partition member 16 including the flow state adjustment portion 50, the circumferential distance B and the radial distance C between the first communication holes 42a adjacent to each other are equal to each other.

In addition, the distances B and C between the first communication holes 42a adjacent to each other in the inner portion 16f of the partition member 16 including the flow state adjustment portion 50 may be equal to or larger than the distance D between the first communication holes 42a adjacent to each other in the outer portion 16g, and the circumferential distance B and the radial distance C between the first communication holes 42a adjacent to each other in the inner portion 16f may be made different from each other.

In the partition member 16 including the flow state adjustment portion 50, the flow resistance of the liquid flowing through the first communication holes 42a that are open to the outer portion 16g and the flow resistance of the liquid flowing through the first communication holes 42a that are open to the inner portion 16f are different from each other. In the present embodiment, in the partition member 16 including the flow state adjustment portion 50, the flow passage cross-sectional area of the first communication hole 42a that is open to the outer portion 16g and the flow passage cross-sectional area of the first communication hole 42a that is open to the inner portion 16f are different from each other. In the partition member 16 including the flow state adjustment portion 50, the flow passage cross-sectional area of each first communication hole 42a is the same over the entire length in the axial direction. In addition, in the partition member 16 including the flow state adjustment portion 50, the flow passage cross-sectional area of each first communication hole 42a may be different depending on an axial position. In this case, the flow passage cross-sectional area of the first communication hole 42a can be represented by the average value of flow passage cross-sectional areas at a plurality of positions in the axial direction.

In the present embodiment, in the partition member 16 including the flow state adjustment portion 50, the flow passage cross-sectional area of the first communication hole 42a that is open to the outer portion 16g is smaller than the flow passage cross-sectional area of the first communication hole 42a that is open to the inner portion 16f. Accordingly, the flow resistance of the liquid flowing through the first communication holes 42a that are open to the outer portion 16g is higher than the flow resistance of the liquid flowing through the first communication holes 42a that are open to the inner portion 16f. Here, the thicknesses of the upper wall 33 and the lower wall 34 are the same over the entire region, and the flow passage length of the first communication holes 42a that are open to the outer portion 16g and the flow passage lengths of the first communication holes 42a that are open to the inner portion 16f are the same as each other.

In addition, in the partition member 16 including the flow state adjustment portion 50, a flow passage length to of the first communication holes 42a that are open to the outer portion 16g and a flow passage length ti of the first communication holes 42a that are open to the inner portion 16f may be made different from each other.

In the vibration-damping device 1 having such a configuration, when idle vibration having a relatively high frequency in the low frequency vibration is input in the axial direction, the movable member 41 is deformed or displaced in the accommodation chamber 42 and the liquid in the liquid chamber 19 flows through the first communication holes 42a and the second communication holes 42b, so that this vibration is damped and absorbed. Additionally, when the shake vibration having a relatively low frequency in the low frequency vibration is input in the axial direction, this vibration is damped and absorbed by the liquid in the liquid chamber 19 flowing through the orifice passage 24.

As described above, according to the vibration-damping device 1 according to the present embodiment, the tubular member 21 protruding toward the elastic body 13 is disposed on the first wall surface 16b of the partition member 16. Thus, when the elastic body 13 is deformed in a secondary vibration mode in a vertical cross-sectional view in the axial direction due to the input of medium frequency vibration in the axial direction, a node portion generated at a central portion of the elastic body 13 in the related art deviates to the second attachment member 12 side due to, for example, the fact that it is difficult for the liquid between the inner peripheral surface 13c of the main liquid chamber 14 and the outer peripheral surface 21s of the upper portion of the tubular member 21 to flow. As a result, in the elastic body 13, a portion located closer to the first attachment member 11 side than the node portion is more easily deformed than a portion located closer to the second attachment member 12 side than the node portion. Accordingly, when the medium frequency vibration in the axial direction is input, the portion of the elastic body 13 located closer to the first attachment member 11 side than the node portion is positively deformed, it is possible to apparently reduce the stiffness of the elastic body 13, and this vibration can be damped and absorbed.

Additionally, since the plurality of first communication holes 42a are open to both the inner portion 16f and the outer portion 16g of the first wall surface 16b, it is possible to dispose many first communication holes 42a in the first wall surface 16b, and for example, the idle vibration having a relatively high frequency in the low frequency vibration can be reliably damped and absorbed.

Additionally, the partition member 16 includes the flow state adjustment portion 50 that adjusts the flow of fluid between the outer peripheral surface 21s of the tubular member 21 and the inner peripheral surface 13c of the main liquid chamber 14. For that reason, it is possible to adjust, for example, the flow state of the liquid, such as flow velocity, between the inner peripheral surface 13c of the main liquid chamber 14 and the outer peripheral surface 21s of the tubular member 21, and the position of the node portion can be easily adjusted.

Additionally, in the partition member 16 including the flow state adjustment portion 50, the flow resistance of the liquid flowing through the first communication holes 42a that are open to the outer portion 16g and the flow resistance of the liquid flowing through the first communication holes 42a that are open to the inner portion 16f are different from each other. For that reason, it is possible to adjust, for example, the flow state of the liquid, such as flow velocity, between the inner peripheral surface 13c of the main liquid chamber 14 and the outer peripheral surface 21s of the upper portion of the tubular member 21, and the position of the node portion can be easily adjusted. Additionally, it is possible to adjust the flow state of the liquid between the inner peripheral surface 13c of the main liquid chamber 14 and the outer peripheral surface 21s of the upper portion of the tubular member 21 by designing the first communication holes 42a provided in the first wall surface 16b instead of the tubular member 21 protruding from the first wall surface 16b. Thus, design restrictions can be less likely to occur as compared with a case where the tubular member 21 is designed to adjust the flow state.

In the partition member 16 including the flow state adjustment portion 50, the flow passage cross-sectional area of the first communication hole 42a that is open to the outer portion 16g and the flow passage cross-sectional area of the first communication hole 42a that is open to the inner portion 16f are different from each other. For that reason, the flow resistance of the liquid flowing through the former first communication hole 42a and the flow resistance of the liquid flowing through the latter first communication hole 42a can be reliably made different from each other. In the partition member 16 including the flow state adjustment portion 50, the number of the first communication holes 42a that are open to the outer portion 16g and the number of the first communication holes 42a that are open to the inner portion 16f are different from each other. Thus, it is easy to adjust, for example, the flow state of the liquid, such as flow velocity, between the inner peripheral surface 13c of the main liquid chamber 14 and the outer peripheral surface 21s of the upper portion of the tubular member 21, and the position of the node portion can be easily adjusted.

In the partition member 16 including the flow state adjustment portion 50, the flow resistance of the liquid flowing through the first communication holes 42a that are open to the outer portion 16g is higher than the flow resistance of the liquid flowing through the first communication holes 42a that are open to the inner portion 16f. For that reason, the liquid between the inner peripheral surface 13c of the main liquid chamber 14 and the outer peripheral surface 21s on the upper portion of the tubular member 21 becomes less likely to flow, and when the medium frequency vibration in the axial direction is input, it is possible to reliably shift the node portion to the second attachment member 12 side, and the medium frequency vibration can be reliably damped and absorbed.

Additionally, since the axial length of the tubular member 21 is equal to or larger than 20% of the axial maximum height T of the main liquid chamber 14, the medium frequency vibration in the axial direction can be reliably damped and absorbed. Additionally, since the inner diameter of the tubular member 21 is equal to or larger than half of the maximum inner diameter R of the main liquid chamber 14, the medium frequency vibration in the axial direction can be reliably damped and absorbed.

Additionally, in the partition member 16 including the flow state adjustment portion 50, the proportion of the opening area of the first communication holes 42a to the plane area of the outer portion 16g and the proportion of the opening area of the first communication holes 42a to the plane area of the inner portion 16f are different from each other. For that reason, it is possible to adjust, for example, the flow state of the liquid, such as flow velocity, between the inner peripheral surface 13c of the main liquid chamber 14 and the outer peripheral surface 21s of the upper portion of the tubular member 21, and the position of the node portion can be easily adjusted.

Additionally, it is possible to adjust the flow state of the liquid between the inner peripheral surface 13c of the main liquid chamber 14 and the outer peripheral surface 21s of the upper portion of the tubular member 21 by designing the first communication holes 42a provided in the first wall surface 16b instead of the tubular member 21 protruding from the first wall surface 16b. Thus, design restrictions can be less likely to occur as compared with a case where the tubular member 21 is designed to adjust the flow state.

Additionally, in the partition member 16 including the flow state adjustment portion 50, the flow passage cross-sectional area of the first communication hole 42a that is open to the outer portion 16g and the flow passage cross-sectional area of the first communication hole 42a that is open to the inner portion 16f are different from each other. For that reason, the proportion of the opening area of the first communication holes 42a to the plane area of the outer portion 16g and the proportion of the opening area of the first communication holes 42a to the plane area of the inner portion 16f can be reliably made different from each other.

Additionally, the distances B and C between the first communication holes 42a adjacent to each other in the inner portion 16f of the partition member 16 including the flow state adjustment portion 50 and the distance D between the first communication holes 42a adjacent to each other in the outer portion 16g are different from each other. For that reason, the proportion of the opening area of the first communication holes 42a to the plane area of the outer portion 16g and the proportion of the opening area of the first communication holes 42a to the plane area of the inner portion 16f can be reliably made different from each other.

Additionally, in the partition member 16 including the flow state adjustment portion 50, the proportion of the opening area of the first communication holes 42a to the plane area of the outer portion 16g is smaller than the proportion of the opening area of the first communication holes 42a to the plane area of the inner portion 16f. For that reason, the liquid between the inner peripheral surface 13c of the main liquid chamber 14 and the outer peripheral surface 21s on the upper portion of the tubular member 21 becomes less likely to flow, and when the medium frequency vibration in the axial direction is input, it is possible to reliably shift the node portion to the second attachment member 12 side, and the medium frequency vibration can be reliably damped and absorbed.

Next, a second embodiment according to the present invention will be described, but the basic configuration thereof is the same as that of the first embodiment. For this reason, the same reference numerals are given to the same components, a description thereof will be omitted, and only different points will be described.

Figure 3:
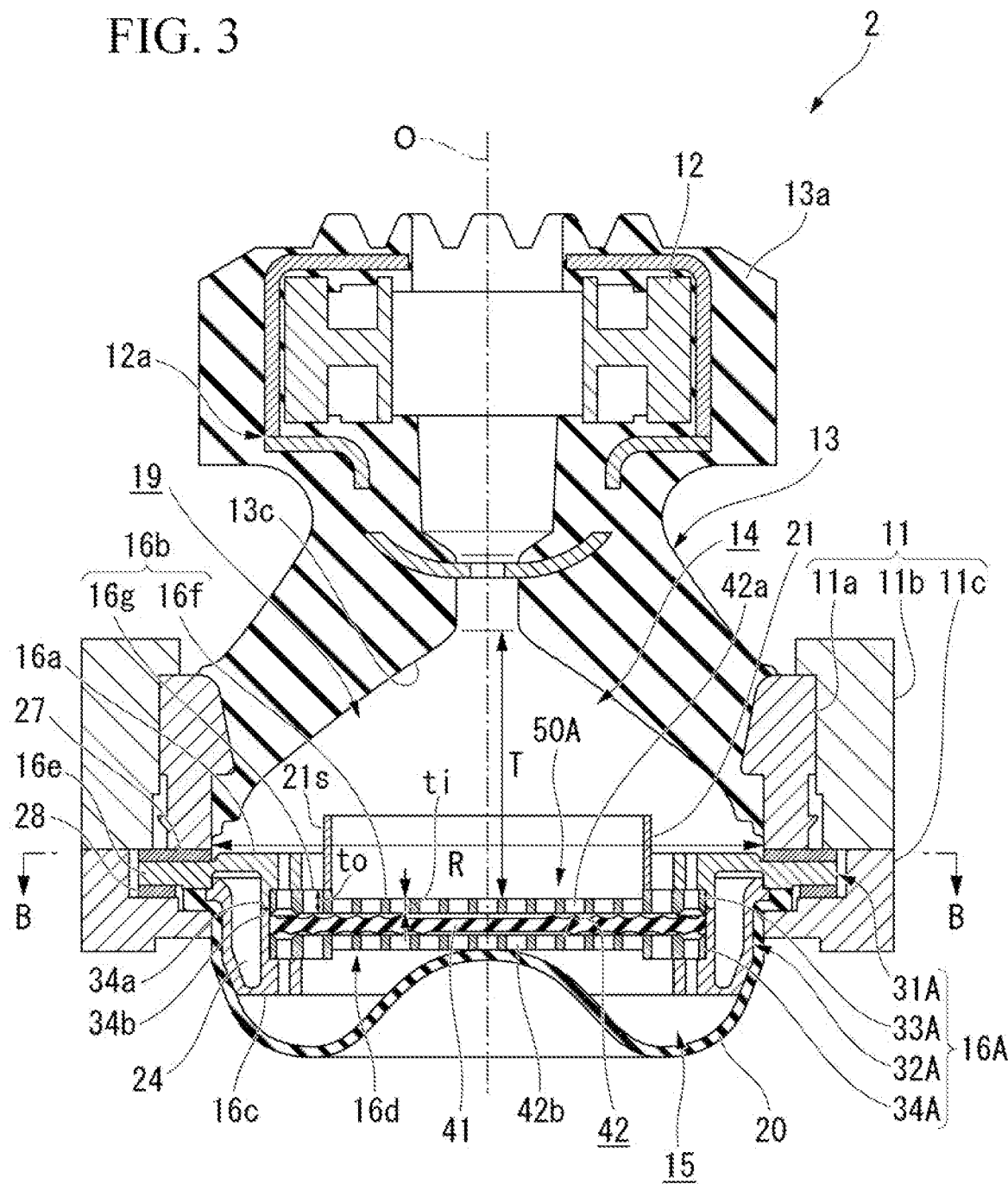
FIG. 3 is a longitudinal sectional view of a vibration-damping device according to a second embodiment of the present invention.

In the vibration-damping device 2 according to the present embodiment, as shown in FIG. 3, in a partition member 16A including a flow state adjustment portion 50A, the flow passage length to of the first communication hole 42a that is open to the outer portion 16g and the flow passage length ti of the first communication hole 42a that is open to the inner portion 16f are different from each other. Accordingly, the flow resistance of the liquid flowing through the first communication holes 42a that are open to the outer portion 16g and the flow resistance of the liquid flowing through the first communication holes 42a that are open to the inner portion 16f are different from each other.

In the present embodiment, in the partition member 16A including the flow state adjustment portion 50A, the flow passage length to of the first communication holes 42a that are open to the outer portion 16g is larger than the flow passage length ti of the first communication holes 42a that are open to the inner portion 16f. Accordingly, the flow resistance of the liquid flowing through the first communication holes 42a that are open to the outer portion 16g is higher than the flow resistance of the liquid flowing through the first communication holes 42a that are open to the inner portion 16f.

In the shown example, in each of an upper wall 33A and a lower wall 34A, the thickness of an outer peripheral portion is larger than the thickness of the portion located radially inside the outer peripheral portion. A lower surface of the upper wall 33A and an upper surface of the lower wall 34A are flat over the entire region. The thicknesses of the outer peripheral portions of the upper wall 33A and the lower wall 34A are the same as each other. The tubular member 21 is disposed on an upper surface of an inner peripheral edge portion of the outer peripheral portion of the upper wall 33A. The upper surface of the outer peripheral portion of the upper wall 33A is an outer portion 16g. From the above, in the partition member 16A including the flow state adjustment portion 50A, the flow passage length to of the first communication holes 42a that are open to the outer portion 16g is larger than the flow passage length ti of the first communication holes 42a that are open to the inner portion 16f.

Figure 4:
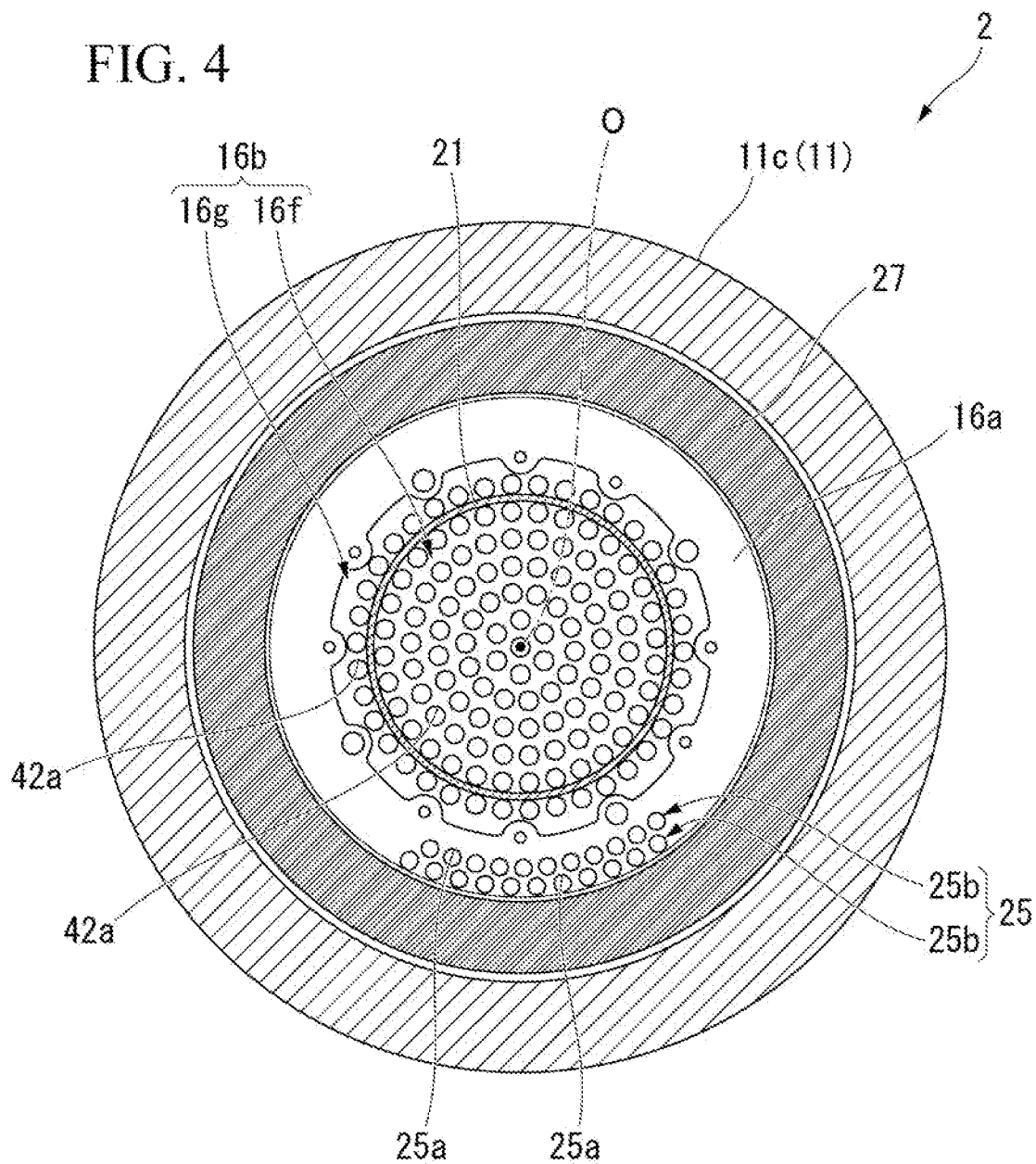
FIG. 4 is a cross-sectional view, taken along arrow line B-B, of the vibration-damping device shown in FIG. 3.

As shown in FIG. 4, in the partition member 16A including the flow state adjustment portion 50A, the flow passage cross-sectional area of the first communication hole 42a that is open to the outer portion 16g and the flow passage cross-sectional area of the first communication hole 42a that is open to the inner portion 16f are the same as each other. In the partition member 16A including the flow state adjustment portion 50A, regarding all of the plurality of first communication holes 42a that are open to the first wall surface 16b, the distances between the first communication holes 42a adjacent to each other are the same as each other and are smaller than the inner diameter of the first communication holes 42a.

According to the vibration-damping device 2 according to the present embodiment, in the partition member 16A including the flow state adjustment portion 50A, the flow passage length to of the first communication hole 42a that is open to the outer portion 16g and the flow passage length ti of the first communication hole 42a that is open to the inner portion 16f are different from each other. For that reason, the flow resistance of the liquid flowing through the former first communication holes 42a and the flow resistance of the liquid flowing through the latter first communication holes 42a can be reliably made different from each other, and the same actions and effects as that of the vibration-damping device 1 according to the first embodiment are provided.

In addition, the technical scope of the invention is not limited to the above embodiment, and various changes can be made within the scope of the invention.

For example, in the partition member 16 including the flow state adjustment portion 50, the flow resistance of the liquid flowing through the first communication holes 42a that are open to the outer portion 16g may be lower than the flow resistance of the liquid flowing through the first communication holes 42a that are open to the inner portion 16f. In the partition member 16 including the flow state adjustment portion 50, the flow passage cross-sectional area of the first communication hole 42a that is open to the outer portion 16g may be made larger than the flow passage cross-sectional area of the first communication hole 42a that is open to the inner portion 16f. In the partition member 16 including the flow state adjustment portion 50, the flow passage length of the first communication holes 42a that are open to the outer portion 16g may be smaller than the flow passage length of the first communication holes 42a that are open to the inner portion 16f. In the partition member 16 including the flow state adjustment portion 50, the number of the first communication holes 42a that are open to the outer portion 16g may be equal to or larger than the number of the first communication holes 42a that are open to the inner portion 16f. In the partition member 16 including the flow state adjustment portion 50, the proportion of the opening area of the first communication holes 42a to the plane area of the outer portion 16g may be equal to or larger than the proportion of the opening area of the first communication holes 42a to the plane area of the inner portion 16f. In the partition member 16 including the flow state adjustment portion 50 of the above embodiment, the total sum of the opening areas of the first communication holes 42a that are open to the inner portion 16f is larger than the total sum of the opening areas of the first communication holes 42a that are open to the outer portion 16g but is not limited thereto. For example, in the partition member 16 including the flow state adjustment portion 50 of the above embodiment, the total sum of the opening areas of the first communication holes 42a that are open to the inner portion 16f may be equal to or smaller than the total sum of the opening areas of the first communication holes 42a that are open to the outer portion 16g.

Additionally, although a configuration in which the tubular member 21 is coupled to the first wall surface 16b so as not to overlap the first communication holes 42a is shown, the tubular member 21 may be coupled to the first wall surface 16b so as to overlap the first communication holes 42a. Additionally, although a configuration formed in a tubular shape extending in the axial direction is shown as the elastic body 13, a configuration formed in an annular plate shape having upper and lower surfaces may be adopted. Additionally, although the recessed portion is formed on the upper wall surface of the partition member 16, the recessed portion may not be formed.

Additionally, in the above embodiments, the compression type vibration-damping devices 1 and 2 in which the positive pressure acts on the main liquid chamber 14 as the support load acts has been described. However, the present invention is also applicable to a hanging-type vibration-damping device that is attached such that the main liquid chamber 14 is located on the lower side in the vertical direction and the auxiliary liquid chamber 15 is located on the upper side in the vertical direction and in which the negative pressure acts on the main liquid chamber 14 as the support load acts.

Additionally, the vibration-damping device 1 or 2 according to the present invention is not limited to an engine mount of a vehicle and can also be applied to those other than the engine mount. For example, the vibration-damping devices are applicable to mounts of power generators loaded on construction machines or are applicable to mounts of machines installed in factories or the like.

In the partition member 16 including the flow state adjustment portion 50, the proportion of the opening area of the first communication holes 42a to the plane area of the outer portion 16g may be larger than the proportion of the opening area of the first communication holes 42a to the plane area of the inner portion 16f.

In the partition member 16 including the flow state adjustment portion 50, the flow passage cross-sectional area of the first communication hole 42a that is open to the outer portion 16g may be made equal to or larger than the flow passage cross-sectional area of the first communication hole 42a that is open to the inner portion 16f.

In the partition member 16 including the flow state adjustment portion 50, the flow resistance of the liquid flowing through the first communication holes 42a that are open to the outer portion 16g may be equal to or smaller than the flow resistance of the liquid flowing through the first communication holes 42a that are open to the inner portion 16f.

In addition, it is possible to appropriately replace the constituent elements in the above embodiments with well-known constituent elements within the scope of the present invention. Additionally, the above embodiments and modification examples may be appropriately combined.

According to the present invention, the tubular member protruding toward the elastic body is disposed on the first wall surface of the partition member. Thus, when the elastic body is deformed in a secondary vibration mode in a vertical cross-sectional view in the axial direction due to the input of medium frequency vibration in the axial direction, a node portion generated at a central portion of the elastic body in the related art deviates to the second attachment member side due to, for example, the fact that it is difficult for the liquid between the inner peripheral surface of the main liquid chamber and the outer peripheral surface of the upper portion of the tubular member to flow. As a result, in the elastic body, a portion located closer to the first attachment member side than the node portion is more easily deformed than a portion located closer to the second attachment member side than the node portion. Accordingly, when the medium frequency vibration in the axial direction is input, the portion of the elastic body located closer to the first attachment member side than the node portion is positively deformed, it is possible to reduce the stiffness of the elastic body, and this vibration can be damped and absorbed.

Additionally, since the plurality of first communication holes are open to both the inner portion located inside the tubular member and the outer portion located outside the tubular member on the first wall surface, it is possible to dispose many first communication holes in the first wall surface, and for example, idle vibration having a relatively high frequency in the low frequency vibration can be reliably damped and absorbed.

Additionally, the partition member includes the flow state adjustment portion that adjusts the flow of fluid between the outer peripheral surface of the tubular member and the inner peripheral surface of the main liquid chamber. For that reason, it is possible to adjust, for example, the flow state of the liquid, such as flow velocity, between the inner peripheral surface of the main liquid chamber and the outer peripheral surface of the tubular member, and the position of the above node portion can be easily adjusted.

Additionally, in the partition member including the flow state adjustment portion, the flow resistance of the liquid flowing through the first communication holes that are open to the outer portion and the flow resistance of the liquid flowing through the first communication holes that are open to the inner portion are different from each other. For that reason, it is possible to adjust, for example, the flow state of the liquid, such as flow velocity, between the inner peripheral surface of the main liquid chamber and the outer peripheral surface of the tubular member, and the position of the above node portion can be easily adjusted.

Additionally, it is possible to adjust the flow state of the liquid between the inner peripheral surface of the main liquid chamber and the outer peripheral surface of the tubular member by designing the first communication holes provided in the first wall surface instead of the tubular member protruding from the first wall surface. Thus, design restrictions can be less likely to occur as compared with a case where the tubular member is designed to adjust the flow state.

In the partition member including the flow state adjustment portion, the flow passage cross-sectional area of the first communication hole that is open to the outer portion and the flow passage cross-sectional area of the first communication hole that is open to the inner portion may be different from each other.

In this case, in the partition member, the flow passage cross-sectional area of the first communication hole that is open to the outer portion and the flow passage cross-sectional area of the first communication hole that is open to the inner portion are different from each other. Thus, the flow resistance of the liquid flowing through the former first communication holes and the flow resistance of the liquid flowing through the latter first communication holes can be reliably made different from each other.

In the partition member, the flow passage length of the first communication hole that is open to the outer portion and the flow passage length of the first communication hole that is open to the inner portion may be different from each other.

In this case, in the partition member, the flow passage length of the first communication holes that are open to the outer portion and the flow passage length of the first communication holes that are open to the inner portion are different from each other. Thus, the flow resistance of the liquid flowing through the former first holes and the flow resistance of the liquid flowing through the latter first communication holes can be reliably made different from each other.

In the partition member, the number of the first communication holes that are open to the outer portion and the number of the first communication holes that are open to the inner portion may be different from each other.

In this case, in the partition member, the number of the first communication holes that are open to the outer portion and the number of the first communication holes that are open to the inner portion are different from each other. Thus, it is easy to adjust, for example, the flow state of the liquid, such as flow velocity, between the inner peripheral surface of the main liquid chamber and the outer peripheral surface of the tubular member, and the position of the node portion can be easily adjusted.

In the partition member, the flow resistance of the liquid flowing through the first communication holes that are open to the outer portion may be higher than the flow resistance of the liquid flowing through the first communication holes that are open to the inner portion.

In this case, in the partition member, the flow resistance of the liquid flowing through the first communication holes that are open to the outer portion is higher than the flow resistance of the liquid flowing through the first communication holes that are open to the inner portion. For that reason, the liquid between the inner peripheral surface of the main liquid chamber and the outer peripheral surface of the tubular member becomes less likely to flow, and when the medium frequency vibration in the axial direction is input, it is possible to reliably shift the node portion to the second attachment member side, and the medium frequency vibration can be reliably damped and absorbed.

According to the present invention, in the partition member including the flow state adjustment portion, the proportion of the opening area of the first communication holes to the plane area of the outer portion and the proportion of the opening area of the first communication holes to the plane area of the inner portion are different from each other. For that reason, it is possible to adjust, for example, the flow state of the liquid, such as flow velocity, between the inner peripheral surface of the main liquid chamber and the outer peripheral surface of the tubular member, and the position of the above node portion can be easily adjusted.

Additionally, it is possible to adjust the flow state of the liquid between the inner peripheral surface of the main liquid chamber and the outer peripheral surface of the tubular member by designing the first communication holes provided in the first wall surface instead of the tubular member protruding from the first wall surface. Thus, design restrictions can be less likely to occur as compared with a case where the tubular member is designed to adjust the flow state.

In the partition member, the flow passage cross-sectional area of the first communication hole that is open to the outer portion and the flow passage cross-sectional area of the first communication hole that is open to the inner portion may be different from each other.

In this case, in the partition member, the flow passage cross-sectional area of the first communication hole that is open to the outer portion and the flow passage cross-sectional area of the first communication hole that is open to the inner portion may be different from each other. For that reason, the proportion of the opening area of the first communication holes to the plane area of the outer portion and the proportion of the opening area of the first communication holes to the plane area of the inner portion can be reliably made different from each other.

In the partition member, the distance between the first communication holes adjacent to each other in the inner portion and the distance between the first communication holes adjacent to each other in the outer portion may be different from each other.

In this case, in the partition member, the distance between the first communication holes adjacent to each other in the inner portion and the distance between the first communication holes adjacent to each other in the outer portion are different from each other. Thus, the proportion of the opening area of the first communication holes to the plane area of the outer portion and the proportion of the opening area of the first communication holes to the plane area of the inner portion can be reliably made different from each other.

In the partition member, the proportion of the opening area of the first communication holes to the plane area of the outer portion may be smaller than the proportion of the opening area of the first communication holes to the plane area of the inner portion.

In this case, in the partition member, the proportion of the opening area of the first communication holes to the plane area of the outer portion is smaller than the proportion of the opening area of the first communication holes to the plane area of the inner portion. For that reason, the liquid between the inner peripheral surface of the main liquid chamber and the outer peripheral surface of the tubular member becomes less likely to flow, and when the medium frequency vibration in the axial direction is input, it is possible to reliably shift the node portion to the second attachment member side, and the medium frequency vibration can be reliably damped and absorbed.

Hereinafter, a third embodiment of a vibration-damping device according to the present invention will be described with reference to FIGS. 5 and 6.

Figure 5:
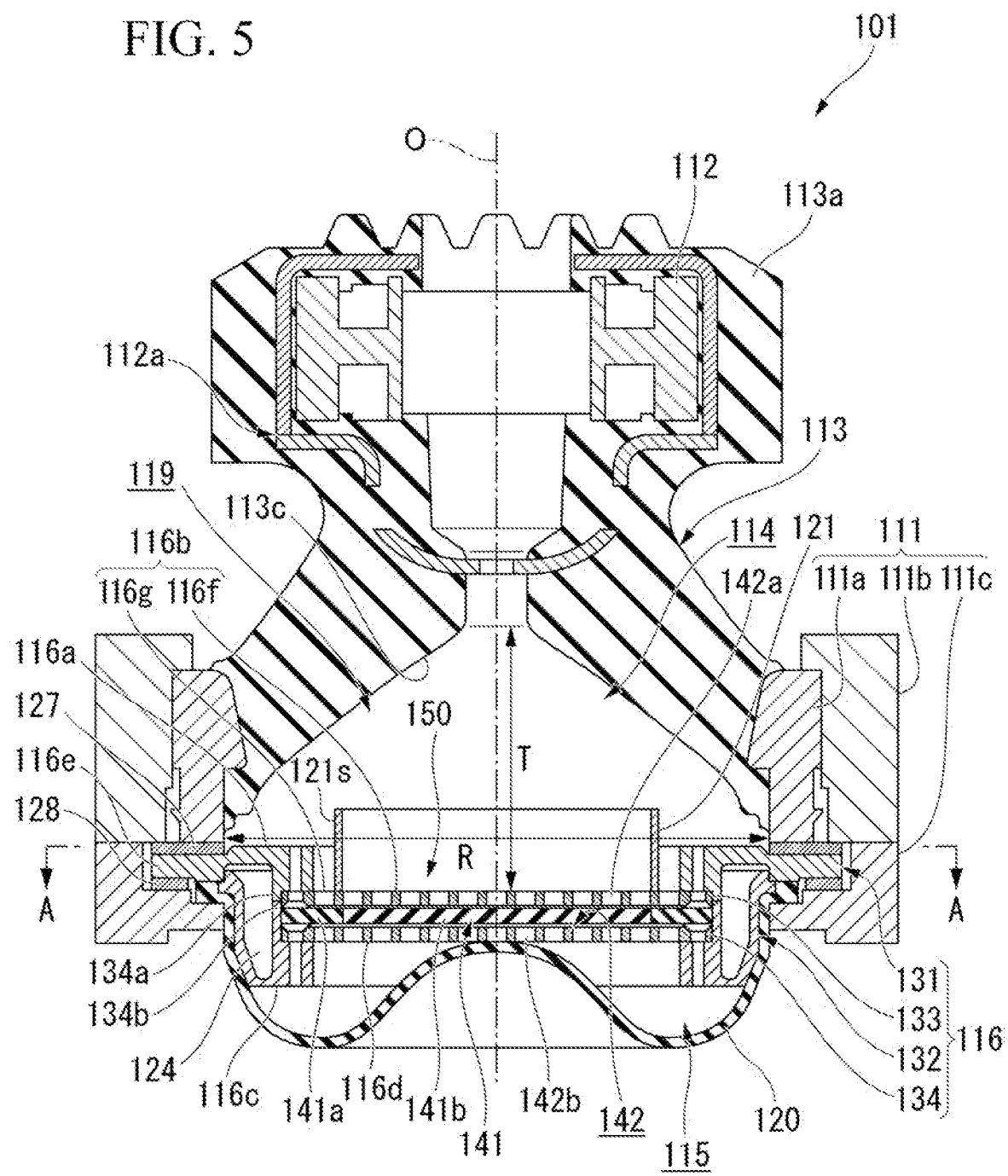
FIG. 5 is a longitudinal sectional view of a vibration-damping device according to a third embodiment of the present invention.

As illustrated in FIG. 5, the vibration-damping device 101 is a liquid-enclosed type vibration-damping device including a tubular first attachment member 111 that is coupled to any one of a vibration generating part and a vibration receiving part, a second attachment member 112 that is coupled to the other of the vibration generating part and the vibration receiving part, an elastic body 113 that elastically couples the first attachment member 111 and the second attachment member 112 to each other, a partition member 116 that partitions a liquid chamber 119 within the first attachment member 111 in which a liquid is enclosed into a main liquid chamber 114 having an elastic body 113 as a portion of a partition wall and an auxiliary liquid chamber 115, and a movable member 141 that is deformably or displaceably accommodated in an accommodation chamber 142 provided in the partition member 116.

Hereinafter, a direction along a central axis O of the first attachment member 111 is referred to as an axial direction. Additionally, the second attachment member 112 side in the axial direction is referred to as an upper side, and the partition member 116 side is referred to as a lower side. Additionally, in a plan view of the vibration-damping device 101 viewed from the axial direction, a direction intersecting the central axis O is referred to as a radial direction, and a direction around the central axis O is referred to as a circumferential direction.

In addition, the first attachment member 111, the second attachment member 112, and the elastic body 113 each have a circular shape or an annular shape in a plan view and are disposed coaxially with the central axis O.

In a case where the vibration-damping device 101 is mounted on, for example, an automobile, the second attachment member 112 is coupled to an engine or the like serving as the vibration generating part, and the first attachment member 111 is coupled to a vehicle body serving as the vibration receiving part. Accordingly, the transmission of vibration of the engine or the like to the vehicle body is suppressed. In addition, the first attachment member 111 may be coupled to the vibration generating part, and the second attachment member 112 may be coupled to the vibration receiving part.

The first attachment member 111 includes an inner tubular portion 111a, an outer tubular portion 111b, and a lower support portion 111c.

The inner tubular portion 111a is fitted into the outer tubular portion 111b. The lower support portion 111c is formed in an annular shape. A lower end opening edge of the outer tubular portion 111b is placed on an upper surface of an outer peripheral portion of the lower support portion 111c. The first attachment member 111 is formed in a cylindrical shape as a whole. The first attachment member 111 is coupled to the vehicle body or the like serving as the vibration receiving part via a bracket that is not shown.

The second attachment member 112 is located radially inside and above the first attachment member 111. The outer diameter of the second attachment member 112 is smaller than the inner diameter of the first attachment member 111. The second attachment member 112 is coupled to an engine or the like serving as the vibration generating part via an attachment metal fitting by fitting the attachment metal fitting (not shown) inside.

In addition, the relative positions of the first attachment member 111 and the second attachment member 112 are not limited to the shown example and may be appropriately changed. Additionally, the outer diameter of the second attachment member 112 may be equal to or larger than the inner diameter of the first attachment member 111.

The elastic body 113 is formed in a tubular shape that extends in the axial direction. The diameter of the elastic body 113 increases downward from above.

The first attachment member 111 and the second attachment member 112 are separately coupled to both end portions of the elastic body 113 in the axial direction. The second attachment member 112 is coupled to an upper end portion of the elastic body 113, and the first attachment member 111 is coupled to a lower end portion of the elastic body 113. The elastic body 113 blocks an upper end opening portion of the first attachment member 111. The lower end portion of the elastic body 113 is coupled to an inner peripheral surface of the inner tubular portion 111a of the first attachment member 111. An upper end portion of the elastic body 113 is coupled to a lower surface of the second attachment member 112. The elastic body 113 is formed of a rubber material or the like and is vulcanized and bonded to the first attachment member 111 and the second attachment member 112. The thickness of the elastic body 113 becomes smaller downward from above. In addition, the elastic body 113 may be formed of, for example, a synthetic resin material or the like.

A stopper rubber 113a that covers an outer peripheral surface and an upper surface of the second attachment member 112 is integrally formed at the upper end portion of the elastic body 113. An outer shell body 112a surrounding the second attachment member 112 is buried in the elastic body 113 and the stopper rubber 113a.

The diaphragm 120 is made of elastic materials, such as rubber or soft resin, and is formed in a bottomed cylindrical shape. As an upper end portion of the diaphragm 120 is sandwiched between an inner peripheral portion of the lower support portion 111c of the first attachment member 111 and an outer peripheral portion of the partition member 116, the liquid-tightness inside the diaphragm 120 is ensured, and a lower end opening portion of the first attachment member 111 is blocked.

In addition, in the shown example, a bottom portion of the diaphragm 120 has a shape that is deep on an outer peripheral side thereof and shallow at a central portion thereof. However, as the shape of the diaphragm 120, various shapes known in the related art can be adopted in addition to such a shape.

As the diaphragm 120 blocks the lower end opening portion of the first attachment member 111, and as described above, the elastic body 113 blocks the upper end opening portion of the first attachment member 111, the inside of the first attachment member 111 is the liquid chamber 119 that is liquid-tightly sealed. The liquid is filled (enclosed) in the liquid chamber 119. Examples of the liquid include ethylene glycol, water, silicone oil, and the like.

The liquid chamber 119 is partitioned into a main liquid chamber 114 and an auxiliary liquid chamber 115 in the axial direction by the partition member 116. The main liquid chamber 114 is a space that has an inner peripheral surface 113c of the elastic body 113 as a portion of a wall surface thereof and is surrounded by the elastic body 113 and the partition member 116, and varies in internal volume depending on the deformation of the elastic body 113. The auxiliary liquid chamber 115 is a space that is surrounded by the diaphragm 120 and the partition member 116, and varies in internal volume depending on the deformation of the diaphragm 120. The vibration-damping device 101 having such a configuration is a compression-type device that is attached and used such that the main liquid chamber 114 is located on an upper side in the vertical direction and the auxiliary liquid chamber 115 is located on a lower side in the vertical direction.

The partition member 116 is provided with a plurality of first communication holes 142a that allow the main liquid chamber 114 and the accommodation chamber 142 to communicate with each other, and a second communication hole 142b that allows the auxiliary liquid chamber 115 and the accommodation chamber 142 to communicate with each other. A plurality of the second communication holes 142b are provided in the partition member 116, and the numbers of the first communication holes 142a and the second communication holes 142b are the same as each other. Each first communication hole 142a and each second communication hole 142b face each other in the axial direction. The inner diameters (flow passage cross-sectional areas) of the first communication hole 142a and the second communication hole 142b facing each other in the axial direction are the same as each other. The flow passage lengths of the first communication hole 142a and the second communication hole 142b facing each other in the axial direction are the same as each other. In addition, one second communication hole 142b may be formed in the partition member 116.

Here, in the partition member 116, an upper wall surface constituting a portion of an inner surface of the main liquid chamber 114 and a lower wall surface constituting a portion of an inner surface of the auxiliary liquid chamber 115 each have a circular shape coaxially disposed with the central axis O when viewed from the axial direction. The diameters of the upper wall surface and the lower wall surface of the partition member 116 are equal to each other. The upper wall surface of the partition member 116 faces the inner peripheral surface 113c of the elastic body 113 in the axial direction, and the lower wall surface of the partition member 116 faces an inner surface of the diaphragm 120 in the axial direction.

In the shown example, a recessed portion is provided over the entire region excluding an outer peripheral edge portion 116a on the upper wall surface of the partition member 116. The plurality of first communication holes 142a are open over the entire region of a bottom surface (hereinafter referred to as a first wall surface) 116b of the recessed portion. A recessed portion is provided over the entire region excluding an outer peripheral edge portion 116c on the lower wall surface of the partition member 116. The plurality of second communication holes 142b are open over the entire region of a bottom surface (hereinafter referred to as a second wall surface) 116d of the recessed portion. The recessed portion on each of the upper wall surface and the lower wall surface has a circular shape disposed coaxially with the central axis O when viewed from the axial direction, and sizes such as the inner diameter and the depth of each recessed portion are the same as each other.

The accommodation chamber 142 is provided in a portion of the partition member 116 located between the first wall surface 116b and the second wall surface 116d in the axial direction. The accommodation chamber 142 has a circular shape disposed coaxially with the central axis O when viewed from the axial direction. The diameter of the accommodation chamber 142 is larger than the diameters of the first wall surface 116b and the second wall surface 116d.

The movable member 141 is formed in a plate shape in which the front and back surfaces face in the axial direction. The movable member 141 has a circular shape disposed coaxially with the central axis O when viewed from the axial direction.

The partition member 116 is provided with an orifice passage 124 that allows the main liquid chamber 114 and the auxiliary liquid chamber 115 to communicate with each other. The orifice passage 124 is provided in a portion of the partition member 116 located between the outer peripheral edge portion 116a of the upper wall surface and the outer peripheral edge portion 116c of the lower wall surface in the axial direction. An upper end of the orifice passage 124 is located above the first wall surface 116b, and a lower end of the orifice passage 124 is located below the second wall surface 116d. The flow passage cross-sectional shape of the orifice passage 124 is an oblong shape long in the axial direction. The resonance frequency of the orifice passage 124 is lower than the resonance frequencies of the first communication hole 142a and the second communication hole 142b.

Figure 6:
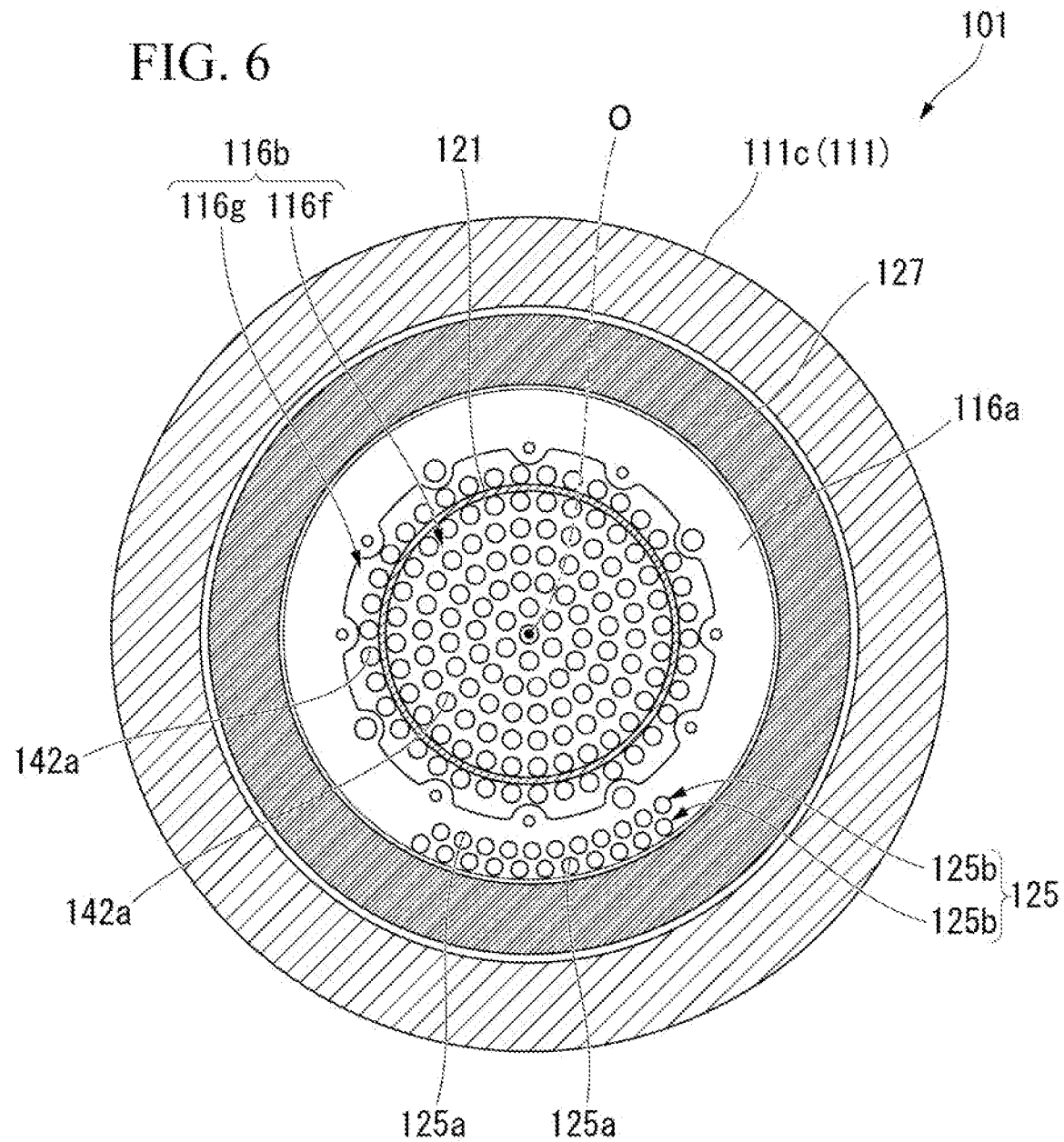
FIG. 6 is a cross-sectional view, taken along arrow line A-A, of the vibration-damping device shown in FIG. 5.

As shown in FIG. 6, an opening portion 125 of the orifice passage 124 on the main liquid chamber 114 side is provided on the outer peripheral edge portion 116a of the upper wall surface of the partition member 116. The opening portion 125 is configured such that a plurality of hole rows 125b in which a plurality of through-holes 125a are disposed at intervals in the circumferential direction are disposed at different positions in the radial direction and the circumferential direction. The inner diameter of the through-hole 125a is smaller than the inner diameter of the first communication hole 142a. Two hole rows 125b are disposed on the outer peripheral edge portion 116a of the upper wall surface of the partition member 116. The deviation amount of each hole row 125b in the circumferential direction and the deviation amount of each hole row 125b in the radial direction are each equal to the inner diameter of the through-hole 125a.

An opening portion on the auxiliary liquid chamber 115 side of the orifice passage 124 is provided on the outer peripheral edge portion 116c of the lower wall surface of the partition member 116 and is one opening having an opening area larger than the opening area of the opening portion 125 on the main liquid chamber 114 side, that is, the total sum of the opening areas of the plurality of through-holes 125a. The opening portion 125 on the main liquid chamber 114 side and the opening portion on the auxiliary liquid chamber 115 side in the orifice passage 124 are located radially outside the first communication hole 142a and the second communication hole 142b.

A flange portion 116e is provided at an upper end portion of the partition member 116 so as to protrude radially outward and continuously extend over the entire circumference. An upper surface of the flange portion 116e abuts against the lower end opening edges of the inner tubular portion 111a and the outer tubular portion 111b of the first attachment member 111 via an annular upper sealing material 127. A lower surface of the flange portion 116e abuts against an upper surface of the inner peripheral portion of the lower support portion 111c of the first attachment member 111 via an upper end opening edge of the diaphragm 120 and an annular lower sealing material 128 that surrounds the upper end opening edge of the diaphragm 120 from the outer side in the radial direction.

The partition member 116 includes an upper tubular body 131 and a lower tubular body 132 disposed so as to butt against each other in the axial direction and includes an upper wall 133 that blocks a lower end opening portion of the upper tubular body 131 and a lower wall 134 that blocks an upper end opening portion of the lower tubular body 132. In addition, the partition member 116 may be integrally formed.

The upper end opening edge of the upper tubular body 131 is the outer peripheral edge portion 116a of the aforementioned upper wall surface of the partition member 116. A flange portion 116e is provided at an upper end portion of the upper tubular body 131. A peripheral groove that is recessed upward and is open radially outward is provided at a portion of a lower end opening edge of the upper tubular body 131, which is located radially outside an inner peripheral portion of the lower end opening edge.

The upper wall 133 is fixed to the inner peripheral portion of the lower end opening edge of the upper tubular body 131. The upper wall 133 is provided with the first communication hole 142*a*.

A peripheral groove that is recessed downward is provided at a radially intermediate portion of the upper end opening edge of the lower tubular body 132, which faces the peripheral groove of the upper tubular body 131 in the axial direction. The orifice passage 124 is defined by this peripheral groove and the peripheral groove of the upper tubular body 131. An outer peripheral edge portion of the upper end opening edge of the lower tubular body 132, which is located radially outside the peripheral groove, abuts against the lower surface of the flange portion 116*e* of the upper tubular body 131. The lower tubular body 132 is fitted into the upper end portion of the diaphragm 120, and the upper end portion of the diaphragm 120 is fitted into the lower support portion 111*c* of the first attachment member 111. Accordingly, the upper end portion of the diaphragm 120 is sandwiched between an outer peripheral surface of the lower tubular body 132 and an inner peripheral surface of the lower support portion 111*c* in the radial direction.

The lower wall 134 is fixed to the inner peripheral portion of the upper end opening edge of the lower tubular body 132. The lower wall 134 is provided with the second communication hole 142*b*.

At least one of the inner peripheral portion at the lower end opening edge of the upper tubular body 131 and the inner peripheral portion of the upper end opening edge of the lower tubular body 132 is provided with butting protrusions 134*a* and 134*b* that protrude toward and abut against the other. In the shown example, the butting protrusions 134*a* and 134*b* are provided on both the inner peripheral portion of the lower end opening edge of the upper tubular body 131 and the inner peripheral portion of the upper end opening edge of the lower tubular body 132. The butting protrusions 134*a* and 134*b* are formed in an annular shape disposed coaxially with the central axis O, and the upper wall 133 and the lower wall 134 are disposed radially inside the butting protrusions 134*a* and 134*b* with a gap in the axial direction from each other. The accommodation chamber 142 is defined by a lower surface of the upper wall 133, an upper surface of the lower wall 134, and inner peripheral surfaces of the butting protrusions 134*a* and 134*b*.

Also, in the present embodiment, a tubular member 121 that protrudes in the axial direction toward the elastic body 113 is disposed on the first wall surface 116*b* of the partition member 116 to which the first communication hole 142*a* is open and which constitutes a portion of the inner surface of the main liquid chamber 114.

The tubular member 121 is formed in a cylindrical shape and is disposed coaxially with the central axis O. The tubular member 121 extends straight in the axial direction. The axial length of the tubular member 121 is equal to or larger than 20% of the axial maximum height T of the main liquid chamber 114. In the shown example, the axial maximum height T of the main liquid chamber 114 is an axial distance between an upper end portion of the inner peripheral surface 113*c* of the elastic body 113, which extends radially inward from the bottom to the top, and the first wall surface 116*b*. The axial length of the tubular member 121 is set such that the upper end portion of the tubular member 121 does not abut against the inner peripheral surface 113*c* of the elastic body 113 when an axial static load is applied to the vibration-damping device 101 and when axial vibration is input.

In addition, as mentioned above, the inner peripheral surface 113*c* of the elastic body 113 is a portion that extends radially inward from the bottom to the top, and the upper end portion of the inner peripheral surface 113*c* of the elastic body 113 is an opening peripheral edge portion of a recessed portion of an inner surface of the elastic body 113 in a case where an upper end portion of the inner surface of the elastic body 113 that defines the main liquid chamber 114 is provided with a recessed portion that is recessed upward, as shown in the shown example.

An upper portion of the tubular member 121 protrudes upward from an upper end opening portion of the recessed portion provided on the upper wall surface of the partition member 116. An outer peripheral surface 121*s* of the upper portion of the tubular member 121 faces a lower end portion of the inner peripheral surface of the inner tubular portion 111*a* of the first attachment member 111 and a lower end portion of the inner peripheral surface 113*c* of the elastic body 113 in the radial direction. The protruding length of the upper portion of the tubular member 121 from the upper end opening portion of the recessed portion is shorter than the depth of the recessed portion. Additionally, the protruding length is shorter than the axial distance between the portion of the inner peripheral surface 113*c* of the elastic body 113 where the upper end opening edge of the tubular member 121 faces in the axial direction and the upper end opening edge of the tubular member 121. The upper end opening edge of the tubular member 121 faces in the axial direction a portion deviating downward from a central portion in a direction in which the inner peripheral surface 113*c* extends, in a vertical cross-sectional view in the axial direction, on the inner peripheral surface 113*c* of the elastic body 113 extending radially inward from the bottom to the top.

The radius of an inner peripheral surface of the tubular member 121 is larger than the radial distance between the outer peripheral surface 121*s* of the tubular member 121 and the inner peripheral surface of the recessed portion provided on the upper wall surface of the partition member 116. The inner diameter of the tubular member 121 is equal to or larger than half of a maximum inner diameter R of the main liquid chamber 114. In the shown example, the maximum inner diameter R of the main liquid chamber 114 is the inner diameter of a lower end portion of the inner tubular portion 111*a* of the first attachment member 111. In the first wall surface 116*b*, the plane area of a portion 116*f* (hereinafter referred to as an inner portion) located inside the tubular member 121 is larger than the plane area of a portion 116*g* (hereinafter referred to as an outer portion) located outside the tubular member 121.

The plurality of first communication holes 142*a* are open to both the inner portion 116*f* and the outer portion 116*g* of the first wall surface 116*b*. All of the plurality of first communication holes 142*a* face an upper surface of the movable member 141. The tubular member 121 is coupled to a portion of the first wall surface 116*b* located between adjacent first communication holes 142*a* and is disposed so as not to overlap the first communication hole 142*a*. The tubular member 121 is disposed such that the inner peripheral surface and the outer peripheral surface 121*s* thereof are in contact with the first communication hole 142*a* when viewed from the axial direction.

Here, the partition member 116 or the movable member 141 includes a flow state adjustment portion 150. The flow state adjustment portion 150 adjusts the flow of a fluid between an outer peripheral surface 121*s* of the tubular member 121 and the inner peripheral surface 113*c* of the main liquid chamber 114. Here, the inner peripheral surface 113c of the main liquid chamber 114 is also the inner peripheral surface 113c of the elastic body 113. In addition, the flow state adjustment portion 150 includes the movable member 141, or the partition member 116 including the plurality of first communication holes 142a. The flow state adjustment portion 150 may have a plurality of different forms to be described below. In addition, the partition member 116 or the movable member 141 is expressed to include the flow state adjustment portion 150, but the partition member 116 or the movable member 141 may be expressed to constitute the flow state adjustment portion 150.

In the partition member 116 including the flow state adjustment portion 150, the number of the first communication holes 142a that are open to the outer portion 116g and the quantity of the first communication holes 142a that are open to the inner portion 116f are different from each other. In the partition member 116 including the flow state adjustment portion 150 of the shown example, the number of the first communication holes 142a that are open to the outer portion 116g is smaller than the number of the first communication holes 142a that are open to the inner portion 116f.

In the partition member 116 including the flow state adjustment portion 150, the proportion of the opening area of the first communication holes 142a to the plane area of the outer portion 116g and the proportion of the opening area of the first communication holes 142a to the plane area of the inner portion 116f are different from each other. In the partition member 116 including the flow state adjustment portion 150 of the shown example, the proportion of the opening area of the first communication holes 142a to the plane area of the outer portion 116g is smaller than the proportion of the opening area of the first communication holes 142a to the plane area of the inner portion 116f.

In the partition member 116 including the flow state adjustment portion 150, the total sum of the opening areas of the first communication holes 142a that are open to the inner portion 116f is larger than the total sum of the opening areas of the first communication holes 142a that are open to the outer portion 116g.

In the partition member 116 including the flow state adjustment portion 150, the flow passage cross-sectional area of the first communication hole 142a that is open to the outer portion 116g and the flow passage cross-sectional area of the first communication hole 142a that is open to the inner portion 116f are the same as each other. In addition, in the partition member 116 including the flow state adjustment portion 150, the flow passage cross-sectional area of the first communication holes 142a that are open to the outer portion 116g and the flow passage cross-sectional area of the first communication holes 142a that are open to the inner portion 116f may be made different from each other.

In the partition member 116 including the flow state adjustment portion 150, regarding all of the plurality of first communication holes 142a that are open to the first wall surface 116b, the distances between the first communication holes 142a adjacent to each other are the same as each other and are smaller than the inner diameter of the first communication holes 142a. In addition, the distances between the first communication holes 142a adjacent to each other in the inner portion 116f of the partition member 116 including the flow state adjustment portion 150 and the distance between the first communication holes 142a adjacent to each other in the outer portion 116g may be made different from each other.

The plurality of first communication holes 142a that are open to the outer portion 116g are disposed at equal intervals in the circumferential direction over the entire length of the outer portion 116g in the circumferential direction.

In the inner portion 116f, the plurality of first communication holes 142a are disposed at equal intervals in the circumferential direction, and the row of the first communication holes 142a arranged at equal intervals in the circumferential direction in this way are disposed concentrically around the central axis O at equal intervals in the radial direction.

Here, in the partition member 116 provided with the flow state adjustment portion 150, the thicknesses of the upper wall 133 and the lower wall 134 are the same over the entire region, and the flow passage length of the first communication holes 142a that are open to the outer portion 116g and the flow passage lengths of the first communication holes 142a that are open to the inner portion 116f are the same as each other. In addition, in the partition member 116 including the flow state adjustment portion 150, the flow passage length of the first communication holes 142a that are open to the outer portion 116g and the flow passage length of the first communication holes 142a that are open to the inner portion 116f may be made different from each other.

In the partition member 116 including the flow state adjustment portion 150, the flow resistance of the liquid flowing through the first communication holes 142a that are open to the outer portion 116g and the flow resistance of the liquid flowing through the first communication holes 142a that are open to the inner portion 116f are the same as each other. In addition, in the partition member 116 including the flow state adjustment portion 150, the flow resistance of the liquid flowing through the first communication holes 142a that are open to the outer portion 116g and the flow resistance of the liquid flowing through the first communication holes 142a that are open to the inner portion 116f may be different each other.

Also, in the present embodiment, in the movable member 141 including the flow state adjustment portion 150, the stiffness of the outer peripheral portion 141a located radially outside the tubular member 121 and the stiffness of the inner portion 141b located radially inside the tubular member 121 are different from each other. In the movable member 141 including the flow state adjustment portion 150, the stiffness of a material forming the outer peripheral portion 141a and the stiffness of a material forming the inner portion 141b are different from each other.

In the movable member 141 including the flow state adjustment portion 150 of the shown example, the stiffness of the material forming the outer peripheral portion 141a is higher than the stiffness of the material forming the inner portion 141b. Accordingly, in the movable member 141 including the flow state adjustment portion 150, the stiffness of the outer peripheral portion 141a is higher than the stiffness of the inner portion 141b. Each of the materials forming the outer peripheral portion 141a and the inner portion 141b is an elastic material such as rubber or a soft resin. The outer peripheral portion 141a and the inner portion 141b are bonded or welded to each other. The diameter of the inner portion 141b is larger than half the diameter of the movable member 141. A boundary portion between the outer peripheral portion 141a and the inner portion 141b is located directly below the tubular member 121. In addition, this boundary portion may be located to slightly deviate in the radial direction with respect to the tubular member 121.

In the vibration-damping device 101 including such a configuration, when the idle vibration having a relatively high frequency in the low frequency vibration is input in the axial direction, the movable member 141 is deformed or displaced in the accommodation chamber 142 and the liquid in the liquid chamber 119 flows through the first communication holes 142a and the second communication holes 142b, so that this vibration is damped and absorbed. Additionally, when the shake vibration having a relatively low frequency in the low frequency vibration is input in the axial direction, this vibration is damped and absorbed by the liquid in the liquid chamber 119 flowing through the orifice passage 124.

As described above, according to the vibration-damping device 101 according to the present embodiment, the tubular member 121 protruding toward the elastic body 113 is disposed on the first wall surface 116b of the partition member 116. Thus, when the elastic body 113 is deformed in a secondary vibration mode in a vertical cross-sectional view in the axial direction due to the input of medium frequency vibration in the axial direction, a node portion generated at a central portion of the elastic body 113 in the related art deviates to the second attachment member 112 side due to, for example, the fact that it is difficult for the liquid between the inner peripheral surface 113c of the main liquid chamber 114 and the outer peripheral surface 121s of the upper portion of the tubular member 121 to flow. As a result, in the elastic body 113, a portion located closer to the first attachment member 111 side than the node portion is more easily deformed than a portion located closer to the second attachment member 112 side than the node portion. Accordingly, when the medium frequency vibration in the axial direction is input, the portion of the elastic body 113 located closer to the first attachment member side 111 than the node portion is positively deformed, it is possible to apparently reduce the stiffness of the elastic body 113, and this vibration can be damped and absorbed.

Additionally, since the plurality of first communication holes 142a are open to both the inner portion 116f and the outer portion 116g of the first wall surface 116b, it is possible to dispose many first communication holes 142a in the first wall surface 116b, and for example, the idle vibration having a relatively high frequency in the low frequency vibration can be reliably damped and absorbed.

Additionally, the partition member 116 or the movable member 141 includes the flow state adjustment portion 150 that adjusts the flow of fluid between the outer peripheral surface 121s of the tubular member 121 and the inner peripheral surface 113c of the main liquid chamber 114. For that reason, it is possible to adjust, for example, the flow state of the liquid, such as flow velocity, between the inner peripheral surface 113c of the main liquid chamber 114 and the outer peripheral surface 121s of the tubular member 121, and the position of the node portion can be easily adjusted.

Additionally, in the movable member 141 including the flow state adjustment portion 150, the stiffness of the outer peripheral portion 141a and the stiffness of the inner portion 141b are different from each other. For that reason, when the vibration is input, the deformation behaviors of the outer peripheral portion 141a and the inner portion 141b of the movable member 141 are made different from each other. Accordingly, it is possible to adjust, for example, the flow state of the liquid, such as flow velocity, between the inner peripheral surface 113c of the main liquid chamber 114 and the outer peripheral surface 121s of the upper portion of the tubular member 121, and the position of the node portion can be easily adjusted.

Additionally, it is possible to adjust the flow state of the liquid between the inner peripheral surface 113c of the main liquid chamber 114 and the outer peripheral surface 121s of the upper portion of the tubular member 121 by designing the movable member 141 accommodated in the accommodation chamber 142 instead of the tubular member 121 protruding from the first wall surface 116b. Thus, design restrictions can be less likely to occur as compared with a case where the tubular member 121 is designed to adjust the flow state.

In the movable member 141 including the flow state adjustment portion 150, the stiffness of a material forming the outer peripheral portion 141a and the stiffness of a material forming the inner portion 141b are different from each other. For that reason, the stiffness of the outer peripheral portion 141a and the stiffness of the inner portion 141b can be reliably made different from each other.

In the movable member 141 including the flow state adjustment portion 150, the stiffness of the outer peripheral portion 141a is higher than the stiffness of the inner portion 141b, and the outer peripheral portion 141a is less likely to be deformed than the inner portion 141b when the vibration is input. For that reason, the liquid between the inner peripheral surface 113c of the main liquid chamber 114 and the outer peripheral surface 121s on the upper portion of the tubular member 121 becomes less likely to flow, and when the medium frequency vibration in the axial direction is input, it is possible to reliably shift the node portion to the second attachment member 112 side, and the medium frequency vibration can be reliably damped and absorbed.

Additionally, since the axial length of the tubular member 121 is equal to or larger than 20% of the axial maximum height T of the main liquid chamber 114, the medium frequency vibration in the axial direction can be reliably damped and absorbed. Additionally, since the inner diameter of the tubular member 121 is equal to or larger than half of the maximum inner diameter R of the main liquid chamber 114, the medium frequency vibration in the axial direction can be reliably damped and absorbed.

Next, a fourth embodiment according to the present invention will be described, but the basic configuration thereof is the same as that of the third embodiment. For this reason, the same reference numerals are given to the same components, a description thereof will be omitted, and only different points will be described.

Figure 7:
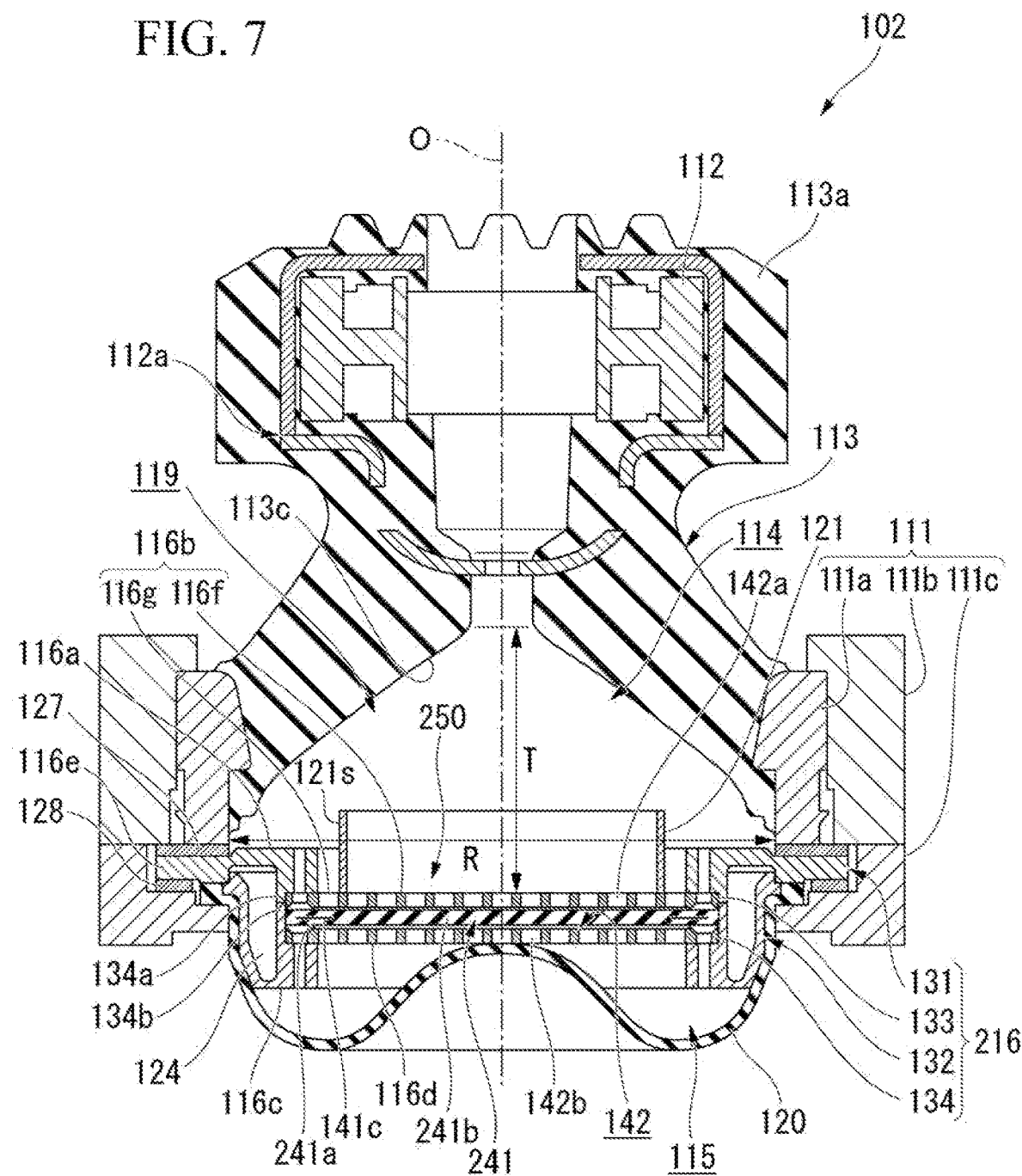
FIG. 7 is a longitudinal sectional view of a vibration-damping device according to a fourth embodiment of the present invention.

In a vibration-damping device 102 according to the present embodiment, as shown in FIG. 7, in the movable member 241 including the flow state adjustment portion 250, a reinforcing member 141c is buried on any one of the outer peripheral portion 241a and the inner portion 241b.

In the shown example, the entire movable member 241 including the flow state adjustment portion 250 is integrally formed of the same material. The reinforcing member 141c is buried in the outer peripheral portion 241a of the movable member 241. The reinforcing member 141c is made of a material having a higher stiffness than a material forming the movable member 241. The reinforcing member 141c is formed of, for example, a rubber material, a fiber, a metal material, a resin material, or the like. The reinforcing member 141c is provided over the entire length of the outer peripheral portion 241a in the circumferential direction. The reinforcing member 141c extends continuously over the entire length in the circumferential direction.

According to the vibration-damping device 102 according to the present embodiment, in the movable member 141 including the flow state adjustment portion 250, the reinforcing member 141c is buried in any one of the outer peripheral portion 241a and the inner portion 241b. For that reason, it is possible to increase the stiffness of the above one, the stiffness of the outer peripheral portion 241a and the stiffness of the inner portion 241b can be reliably made different from each other in the movable member 241, and the same actions and effects as those of the vibration-damping device 101 according to the first embodiment can be provided.

Next, a fifth embodiment according to the present invention will be described, but the basic configuration thereof is the same as that of the third embodiment. For this reason, the same reference numerals are given to the same components, a description thereof will be omitted, and only different points will be described.

Figure 8:
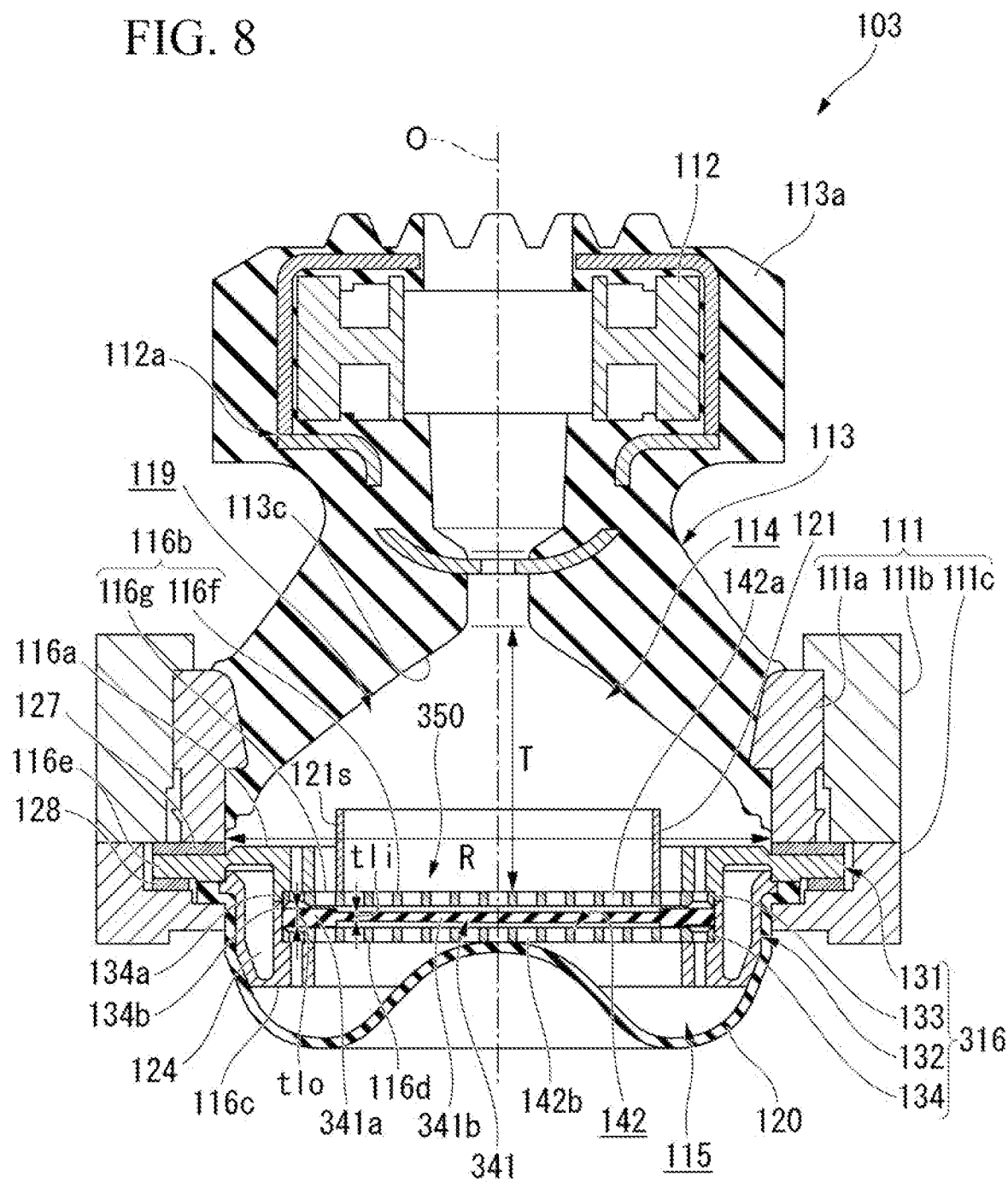
FIG. 8 is a longitudinal sectional view of a vibration-damping device according to a fifth embodiment of the present invention.

In the vibration-damping device 103 according to the present embodiment, as shown in FIG. 8, in the movable member 341 including the flow state adjustment portion 350, a thickness t1o of the outer peripheral portion 341a and a thickness t1i of the inner portion 341b are different from each other.

In the shown example, the entire movable member 341 including the flow state adjustment portion 350 is integrally formed of the same material. In the movable member 341 including the flow state adjustment portion 350, the thickness t1o of the outer peripheral portion 341a is larger than the thickness t1i of the inner portion 341b. In the movable member 341 including the flow state adjustment portion 350, the thickness t1o of the outer peripheral portion 341a is larger than the thickness t1i of the inner portion 341b over the entire length in the circumferential direction.

According to the vibration-damping device 103 according to the present embodiment, in the movable member 341 including the flow state adjustment portion 350, the thickness t1o of the outer peripheral portion 341a and the thickness t1i of the inner portion 341b are different from each other. For that reason, the stiffness of the outer peripheral portion 341a and the stiffness of the inner portion 341b can be reliably made different from each other, and the same actions and effects as those of the vibration-damping device 101 according to the first embodiment can be provided.

In addition, the technical scope of the invention is not limited to the above embodiment, and various changes can be made within the scope of the present invention.

For example, in the movable member 141 including the flow state adjustment portion 150, the stiffness of the material forming the outer peripheral portion 141a may be made lower than the stiffness of the material forming the inner portion 141b, and the stiffness of the outer peripheral portion 141a may be made lower than the stiffness of the inner portion 141b.

In the movable member 141 including the flow state adjustment portion 150, the reinforcing member 141c may be buried in the inner portion 141b of the movable member 141, and the stiffness of the outer peripheral portion 141a may be lower than the stiffness of the inner portion 141b.

In the movable member 341 including the flow state adjustment portion 350, the thickness t1o of the outer peripheral portion 341a is made smaller than the thickness t1i of the inner portion 341b, and the stiffness of the outer peripheral portion 341a may be made lower than the stiffness of the inner portion 341b.

In the movable member 141 including the flow state adjustment portion 150, the outer peripheral portion 141a and the inner portion 141b may be divided into separate bodies from each other.

In the partition member 116 including the flow state adjustment portion 150, the number of the first communication holes 142a that are open to the outer portion 116g may be equal to or larger than the number of the first communication holes 142a that are open to the inner portion 116f.

In the partition member 116 including the flow state adjustment portion 150, the proportion of the opening area of the first communication holes 142a to the plane area of the outer portion 116g may be equal to or larger than the proportion of the opening area of the first communication holes 142a to the plane area of the inner portion 116f.

In the above embodiment, in the partition member 116 including the flow state adjustment portion 150, the total sum of the opening areas of the first communication holes 142a that are open to the inner portion 116f is larger than the total sum of the opening areas of the first communication holes 142a that are open to the outer portion 116g but is not limited thereto. For example, the total sum of the opening areas of the first communication holes 142a that are open to the inner portion 116f may be equal to or smaller than the total sum of the opening areas of the first communication holes 142a that are open to the outer portion 116g.

Additionally, although a configuration in which the tubular member 121 is coupled to the first wall surface 116b so as not to overlap the first communication holes 142a is shown, the tubular member 121 may be coupled to the first wall surface 116b so as to overlap the first communication holes 142a.

Additionally, although a configuration formed in a tubular shape extending in the axial direction is shown as the elastic body 113, a configuration formed in an annular plate shape having upper and lower surfaces may be adopted.

Additionally, although the recessed portion is formed on the upper wall surface of the partition member 116, the recessed portion may not be formed.

Additionally, in the above embodiments, the compression type vibration-damping devices 101, 102, 103 in which the positive pressure acts on the main liquid chamber 114 as the support load acts has been described. However, the present invention is also applicable to a hanging-type vibration-damping device that is attached such that the main liquid chamber 114 is located on the lower side in the vertical direction and the auxiliary liquid chamber 115 is located on the upper side in the vertical direction and in which the negative pressure acts on the main liquid chamber 114 as the support load acts.

Additionally, the vibration-damping device 101, 102, or 103 according to the present invention is not limited to an engine mount of a vehicle and can also be applied to those other than the engine mount. For example, the vibration-damping devices are applicable to mounts of power generators loaded on construction machines or are applicable to mounts of machines installed in factories or the like.

In addition, it is possible to appropriately replace the constituent elements in the above embodiments with well-known constituent elements within the scope of the present invention. Additionally, the above embodiments and modification examples may be appropriately combined.

For example, cases where the partition member includes the flow state adjustment portion in two ways (the case where the flow resistance of the liquid flowing through the first communication holes that are open to the outer portion and the flow resistance of the liquid flowing through the first communication holes that are open to the inner portion are different from each other and the case where the proportion of the opening area of the first communication holes to the plane area of the outer portion and the proportion of the opening area of the first communication holes to the plane area of the inner portion are different from each other) may be combined with each other.

In addition, either or both of the cases where the partition member includes the flow state adjustment portion in two ways (the case where the flow resistance of the liquid flowing through the first communication holes that are open to the outer portion and the flow resistance of the liquid flowing through the first communication holes that are open to the inner portion are different from each other and/or the case where the proportion of the opening area of the first communication holes to the plane area of the outer portion and the proportion of the opening area of the first communication holes to the plane area of the inner portion are different from each other) and the case where the movable member includes the flow state adjustment portion (the case where the stiffness of the outer peripheral portion located radially outside the tubular member and the stiffness of the inner portion located radially inside the tubular member are different from each other) may be combined with each other.

According to the present invention, the tubular member protruding toward the elastic body is disposed on the first wall surface of the partition member. Thus, when the elastic body is deformed in a secondary vibration mode in a vertical cross-sectional view in the axial direction due to the input of medium frequency vibration in the axial direction, a node portion generated at a central portion of the elastic body in the related art deviates to the second attachment member side due to, for example, the fact that it is difficult for the liquid between the inner peripheral surface of the main liquid chamber and the outer peripheral surface of the tubular member to flow. As a result, in the elastic body, a portion located closer to the first attachment member side than the node portion is more easily deformed than a portion located closer to the second attachment member side than the node portion. Accordingly, when the medium frequency vibration in the axial direction is input, the portion of the elastic body located closer to the first attachment member side than the node portion is positively deformed, it is possible to reduce the stiffness of the elastic body, and this vibration can be damped and absorbed.

Additionally, since the plurality of first communication holes are open to both the inner portion located inside the tubular member and the outer portion located outside the tubular member on the first wall surface, it is possible to dispose many first communication holes in the first wall surface, and for example, idle vibration having a relatively high frequency in the low frequency vibration can be reliably damped and absorbed. Additionally, the partition member or the movable member includes the flow state adjustment portion. For that reason, it is possible to adjust, for example, the flow state of the liquid, such as flow velocity, between the inner peripheral surface of the main liquid chamber and the outer peripheral surface of the tubular member, and the position of the above node portion can be easily adjusted.

Additionally, in the movable member including the flow state adjustment portion, the stiffness of the outer peripheral portion and the stiffness of the inner portion are different from each other. Thus, when the vibration is input, the deformation behaviors of the outer peripheral portion and the inner portion of the movable member are made different from each other. Accordingly, it is possible to adjust, for example, the flow state of the liquid, such as flow velocity, between the inner peripheral surface of the main liquid chamber and the outer peripheral surface of the tubular member, and the position of the node portion can be easily adjusted.

Additionally, it is possible to adjust the flow state of the liquid between the inner peripheral surface of the main liquid chamber and the outer peripheral surface of the tubular member by designing the movable member accommodated in the accommodation chamber instead of the tubular member protruding from the first wall surface. Thus, design restrictions can be less likely to occur as compared with a case where the tubular member is designed to adjust the flow state.

In the movable member, the stiffness of the material forming the outer peripheral portion and the stiffness of the material forming the inner portion may be different from each other.

In this case, in the movable member, the stiffness of the material forming the outer peripheral portion and the stiffness of the material forming the inner portion are different from each other. Thus, the stiffness of the outer peripheral portion and the stiffness of the inner portion can be reliably made different from each other.

In the movable member, the reinforcing member may be buried in any one of the outer peripheral portion and the inner portion.

In this case, in the movable member, the reinforcing member is buried in any one of the outer peripheral portion and the inner portion. For that reason, it is possible to increase the stiffness of the above one, and the stiffness of the outer peripheral portion and the stiffness of the inner portion can be reliably made different from each other in the movable member.

In the movable member, the thickness of the outer peripheral portion and the thickness of the inner portion may be different from each other.

In this case, in the movable member, the thickness of the outer peripheral portion and the thickness of the inner portion are different from each other. Thus, the stiffness of the outer peripheral portion and the stiffness of the inner portion can be reliably made different from each other.

In the movable member, the stiffness of the outer peripheral portion may be higher than the stiffness of the inner portion.

In this case, in the movable member, the stiffness of the outer peripheral portion is higher than the stiffness of the inner portion, and the outer peripheral portion is less likely to be deformed than the inner portion when the vibration is input. For that reason, the liquid between the inner peripheral surface of the main liquid chamber and the outer peripheral surface of the tubular member becomes less likely to flow, and when the medium frequency vibration in the axial direction is input, it is possible to reliably shift the node portion to the second attachment member side, and the medium frequency vibration can be reliably damped and absorbed.

INDUSTRIAL APPLICABILITY

According to the vibration-damping device according to the present invention, the medium frequency vibration can be damped and absorbed.

REFERENCE SIGNS LIST

1, 2, 101, 102, 103: Vibration-damping device
11, 111: First attachment member
12, 112: Second attachment member
13, 113: Elastic body
14, 114: Main liquid chamber
15, 115: Auxiliary liquid chamber 16, 16A, 116, 216, 316: Partition member
16b, 116b: First wall surface
16f, 116f: Inner portion
16g, 116g: Outer portion
19, 119: Liquid chamber
21, 121: Tubular member
24, 124: Orifice passage
41, 141, 241, 341: Movable member
42, 142: Accommodation chamber
42a, 142a: First communication hole
42b, 142b: Second communication hole
50, 50A, 150, 250, 350: Flow state adjustment portion

The invention claimed is:

1. A vibration-damping device comprising:
a tubular first attachment member that is coupled to any one of a vibration generating part and a vibration receiving part, and a second attachment member that is coupled to the other thereof;
an elastic body that elastically couples both the attachment members to each other;
a partition member that partitions a liquid chamber in the first attachment member in which a liquid is enclosed into a main liquid chamber having the elastic body as a portion of a partition wall and an auxiliary liquid chamber in an axial direction along a central axis of the first attachment member; and
a movable member that is deformably or displaceably accommodated in an accommodation chamber provided in the partition member,
wherein the partition member is provided with an orifice passage that allows the main liquid chamber and the auxiliary liquid chamber to communicate with each other, a plurality of first communication holes that allow the main liquid chamber and the accommodation chamber to communicate with each other, and a second communication hole that allows the auxiliary liquid chamber and the accommodation chamber to communicate with each other,
a tubular member that protrudes in the axial direction toward the elastic body is disposed on a first wall surface of the partition member to which the plurality of first communication holes are open and which constitutes a portion of an inner surface of the main liquid chamber,
the plurality of first communication holes are open to both an inner portion located inside the tubular member and an outer portion located outside the tubular member, on the first wall surface, and
the partition member or the movable member includes a flow state adjustment portion that adjusts a flow of the fluid between an outer peripheral surface of the tubular member and an inner peripheral surface of the main liquid chamber.

2. The vibration-damping device according to claim 1, wherein in the partition member including the flow state adjustment portion, a flow resistance of a liquid flowing through the first communication holes that are open to the outer portion and a flow resistance of a liquid flowing through the first communication holes that are open to the inner portion are different from each other.

3. The vibration-damping device according to claim 2, wherein in the partition member, a flow passage cross-sectional area of the first communication hole that is open to the outer portion and a flow passage cross-sectional area of the first communication hole that is open to the inner portion are different from each other.

4. The vibration-damping device according to claim 3, wherein in the partition member, a flow passage length of the first communication holes that are open to the outer portion and a flow passage length of the first communication holes that are open to the inner portion are different from each other.

5. The vibration-damping device according to claim 3, wherein in the partition member, the number of the first communication holes that are open to the outer portion and the number of the first communication holes that are open to the inner portion are different from each other.

6. The vibration-damping device according to claim 3, wherein in the partition member, the flow resistance of the liquid flowing through the first communication holes that are open to the outer portion is higher than the flow resistance of the liquid flowing through the first communication holes that are open to the inner portion.

7. The vibration-damping device according to claim 2, wherein in the partition member, a flow passage length of the first communication holes that are open to the outer portion and a flow passage length of the first communication holes that are open to the inner portion are different from each other.

8. The vibration-damping device according to claim 7, wherein in the partition member, the number of the first communication holes that are open to the outer portion and the number of the first communication holes that are open to the inner portion are different from each other.

9. The vibration-damping device according to claim 7, wherein in the partition member, the flow resistance of the liquid flowing through the first communication holes that are open to the outer portion is higher than the flow resistance of the liquid flowing through the first communication holes that are open to the inner portion.

10. The vibration-damping device according to claim 2, wherein in the partition member, the number of the first communication holes that are open to the outer portion and the number of the first communication holes that are open to the inner portion are different from each other.

11. The vibration-damping device according to claim 2, wherein in the partition member, the flow resistance of the liquid flowing through the first communication holes that are open to the outer portion is higher than the flow resistance of the liquid flowing through the first communication holes that are open to the inner portion.

12. The vibration-damping device according to claim 1, wherein in the partition member including the flow state adjustment portion, a proportion of an opening area of the first communication holes to a plane area of the outer portion and a proportion of the opening area of the first communication holes to a plane area of the inner portion are different from each other.

13. The vibration-damping device according to claim 12, wherein in the partition member, a flow passage cross-sectional area of the first communication hole that is open to the outer portion and a flow passage cross-sectional area of the first communication hole that is open to the inner portion are different from each other.

14. The vibration-damping device according to claim 12, wherein in the partition member, a distance between the first communication holes adjacent to each other in the inner portion and a distance between the first communication holes adjacent to each other in the outer portion are different from each other.

15. The vibration-damping device according to claim 12, wherein in the partition member, a proportion of an opening area of the first communication holes to a plane area of the outer portion is smaller than a proportion of the opening area of the first communication holes to a plane area of the inner portion.

16. The vibration-damping device according to claim 1, wherein in the movable member including the flow state adjustment portion, a stiffness of an outer peripheral portion located radially outside the tubular member and a stiffness of an inner portion located radially inside the tubular member are different from each other.

17. The vibration-damping device according to claim 16, wherein in the movable member, a stiffness of a material forming the outer peripheral portion and a stiffness of a material forming the inner portion are different from each other.

18. The vibration-damping device according to claim 16, wherein in the movable member, a reinforcing member is buried in any one of the outer peripheral portion and the inner portion.

19. The vibration-damping device according to claim 16, wherein in the movable member, a thickness of the outer peripheral portion and a thickness of the inner portion are different from each other.

20. The vibration-damping device according to claim 16, wherein in the movable member, the stiffness of the outer peripheral portion is higher than the stiffness of the inner portion.

\* \* \* \* \*